(12) United States Patent
Eitan et al.

(10) Patent No.: US 10,333,669 B2
(45) Date of Patent: Jun. 25, 2019

(54) APPARATUS AND METHOD FOR TRANSMITTING SINGLE CHANNEL, BONDED CHANNEL, AND MIMO OFDM FRAMES WITH FIELDS TO FACILITATE AGC, TIMING, AND CHANNEL ESTIMATION

(71) Applicant: QUALCOMM Incorporated, San Diego, CA (US)

(72) Inventors: Alecsander Eitan, Haifa (IL); Amichai Sanderovich, Atlit (IL); Gal Basson, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 15/439,048

(22) Filed: Feb. 22, 2017

(65) Prior Publication Data

US 2017/0257201 A1    Sep. 7, 2017

Related U.S. Application Data

(60) Provisional application No. 62/302,754, filed on Mar. 2, 2016.

(51) Int. Cl.
*H04L 5/00* (2006.01)
*H04W 52/52* (2009.01)
(Continued)

(52) U.S. Cl.
CPC ......... *H04L 5/0048* (2013.01); *H04B 7/0413* (2013.01); *H04L 25/0226* (2013.01);
(Continued)

(58) Field of Classification Search
None
See application file for complete search history.

(56) References Cited

U.S. PATENT DOCUMENTS

| 7,372,910 B2 | 5/2008 | Suh et al. |
| 2005/0136933 A1 | 6/2005 | Sandhu et al. |

(Continued)

FOREIGN PATENT DOCUMENTS

| EP | 1622290 A1 | 2/2006 |
| WO | WO-2005018180 A1 | 2/2005 |

(Continued)

OTHER PUBLICATIONS

IEEE LAN/MAN Standards Committee: 11 Part 11: Wireless LAN Medium Access Control (MAC) and Physical Layer (PHY) Specifications Amendment 3: Enhancements for Very High Throughput in the 60 GHz B, IEEE Standard, Dec. 28, 2012 (Dec. 28, 2012), XP002773335, pp. 447-470.

(Continued)

*Primary Examiner* — Candal Elpenord
(74) *Attorney, Agent, or Firm* — Loza & Loza, LLP/Qualcomm

(57) ABSTRACT

Disclosed is an apparatus for wireless communications. The apparatus includes a processing system configured to generate a single-channel frame, a bonded channel frame, or a MIMO channel frame. Each of the frame types includes a first portion and a second portion, said first portion being decodable by a first device operating according to a first protocol, said second portion not being decodable by the first device, wherein the first and second portions are decodable by a second device operating according to a second protocol; and an interface configured to output the frame for transmission. The second portion includes a first field including frequency-domain PRBS data for AGC, a second field including a time-domain sequence for timing of input sample window for FFT processing, and a third field including frequency-domain pilots for channel estimation. For (Continued)

MIMO, these fields for different transmit chains are transmitted in a time aligned manner.

27 Claims, 10 Drawing Sheets

(51) Int. Cl.
    *H04B 7/0413*     (2017.01)
    *H04L 27/26*     (2006.01)
    *H04L 25/02*     (2006.01)

(52) U.S. Cl.
    CPC ........ *H04L 27/2602* (2013.01); *H04L 27/262* (2013.01); *H04L 27/265* (2013.01); *H04L 27/2613* (2013.01); *H04W 52/52* (2013.01)

(56) References Cited

U.S. PATENT DOCUMENTS

| | | | |
|---|---|---|---|
| 2007/0104088 | A1 | 5/2007 | Mujtaba |
| 2011/0051705 | A1* | 3/2011 | Jones, IV ............ H04L 27/2613 370/338 |
| 2014/0362935 | A1 | 12/2014 | Porat et al. |
| 2015/0131756 | A1* | 5/2015 | Suh ..................... H04L 27/2602 375/295 |
| 2016/0182976 | A1 | 6/2016 | Kwon et al. |
| 2016/0323755 | A1* | 11/2016 | Cordeiro ............ H04J 13/0014 |
| 2017/0048095 | A1* | 2/2017 | Sun ..................... H04L 27/2692 |
| 2017/0207944 | A1* | 7/2017 | Zhang ..................... H04L 29/06 |

FOREIGN PATENT DOCUMENTS

| | | |
|---|---|---|
| WO | WO-2008087579 A2 | 7/2008 |
| WO | WO-2016094542 A2 | 6/2016 |
| WO | WO-2016167908 A1 | 10/2016 |

OTHER PUBLICATIONS

International Search Report and Written Opinion—PCT/US2017/019187—ISA/EPO—dated Sep. 25, 2017.

Moon S (Newracom): "LTF Sequence Designs; 11-15-1303-00-00ax-ltf-sequence-designs", IEEE Draft; 11-15-1303-00-00AX-LTF-Sequence-Designs, IEEE-SA Mentor, Piscataway, NJ USA, vol. 802.IIax, Nov. 9, 2015 (Nov. 9, 2015), XP068099246, pp. 1-25.

Ohlmer E., et al., "Algorithm for Detecting the Number of Transmit Antennas in MIMO-OFDM Systems", Vehicular Technology Conference, 2000, VTC Spring 2000, IEEE, IEEE, Piscataway, NJ, USA, May 11, 2000 (May 11, 2000), XP031255575, pp. 478-482.

Perahia E, Robert Stacey: "Next Generation Wireless LANs", Jan. 1, 2013 (Jan. 1, 2013), Cambridge University Press, USA, XP002773336, pp. 74-88.

Cordeiro C., (Intel): "Specification Framework for Tgay; 11-15-1358-02-00ay-specification-framework-for-tgay", IEEE Draft, vol. 802.11 ay, No. 2, Jan. 28, 2016, XP068104703, pp. 1-6.

Kim B., et al., "Integer Frequency Offset Estimation for IEEE 802.15.4g Sun MR-OFDM Phy", Signal Processing and Communication Systems, Dec. 12, 2011, XP032103341, pp. 1-4.

Mathuranathan: "Maximum Length Sequences ( m-sequences)", Sep. 30, 2010, XP002771442, Retrieved from the Internet: URL:https://web.archive.org/web/20131016203636/http://www.gaussianwaves.com:80/2010/09/maximum-length-sequences-msequences-2/, [retrieved on Jun. 22, 2017], 3 pages.

Partial International Search Report—PCT/US2017/019187—ISA/EPO—dated Jul. 10, 2017.

Thakur R., et al., "Synchronization and Preamble Concept for Frame Detection in OFDM", International Journal of Modeling and Optimization, Jan. 1, 2013, XP055385739, ISSN: 2010-3697, DOI:10.7763/IJM0.2013.V3.237, pp. 71-73.

\* cited by examiner

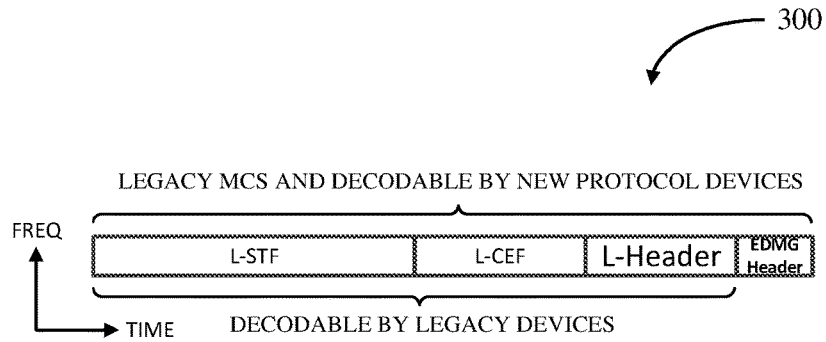

FIG. 3A

| Description | Bits | Notes |
|---|---|---|
| Payload data Length | 24 | |
| EDMG Header Number of LDPC blocks | 10 | Value is +1 (when this field is 0, it means 1 LDPC block) |
| Spatial streams | 4 | 1 . . . 16 |
| Channels | 3 | 1 . . . 8 |
| Channel Offset | 3 | 0 . . . 7 (The offset of this channel in the channel bonding) |
| 11ay MCS | 6 | |
| GI mode | 1 | Short or Long GI |
| FFT mode | 1 | Short or Long FFT |
| LDPC mode | 1 | Short (same as 11ad) or Long |
| Long CES | 1 | Indicate long channel estimation sequence |
| Reserved bits | 26 | |
| Proprietary bits | 8 | |
| CRC | 16 | |
| Total | 104 | bits |

FIG. 3B

| Tx Chain Index | CB=1 | CB=2 | CB=3 | CB=4 |
|---|---|---|---|---|
| 0 | 3 | 3 | 9 | 10 |
| 1 | 4 | 7 | 11 | 13 |
| 2 | 6 | 13 | 15 | 17 |
| 3 | 7 | 42 | 31 | 33 |
| 4 | 9 | 51 | 50 | 52 |
| 5 | 11 | 100 | 78 | 79 |
| 6 | 14 | 121 | 101 | 103 |
| 7 | 19 | 145 | 150 | 152 |
| 8 | 22 | 160 | 230 | 232 |
| 9 | 25 | 300 | 351 | 353 |
| 10 | 31 | 321 | 420 | 422 |
| 11 | 55 | 444 | 655 | 657 |

FIG. 11

APPARATUS AND METHOD FOR TRANSMITTING SINGLE CHANNEL, BONDED CHANNEL, AND MIMO OFDM FRAMES WITH FIELDS TO FACILITATE AGC, TIMING, AND CHANNEL ESTIMATION

CROSS-REFERENCE TO RELATED APPLICATION

This application claims the benefit of the filing date of U.S. Provisional Application, Ser. No. 62/302,754, filed on Mar. 2, 2016, which is incorporated herein by reference.

FIELD

Certain aspects of the present disclosure generally relate to wireless communications and, more particularly, to an apparatus and method for transmitting a single-channel orthogonal frequency division multiplexing (OFDM) frame, a bonded-channel OFDM frame, a single-channel multiple-input-multiple-output (MIMO) OFDM frame, and a bonded-channel MIMO OFDM frame, each having one or more fields to assist in performing automatic gain control (AGC), timing associated with performing Fast Fourier Transform (FFT), and channel estimation associated with the received frame.

BACKGROUND

A transmission of an orthogonal frequency division multiplexing (OFDM) frame for successful transmission, reception, and decoding should include certain information. For instance, such frame should include information so that a transmitter and/or a receiver may perform automatic gain control (AGC) to operate its front-end components in desirable linearity regions. Such frame should also include information so that a receiver is able to determine an optimum time window to input samples of a received signal into a Fast Fourier Transform (FFT) for processing. Additionally, such frame should include information to allow a receiver to estimate the channel through which the frame propagates so that appropriate equalization may be performed to the received frame.

The aforementioned information that should be transmitted in an OFDM frame applies to frames that send OFDM transmission via a bonded channel. Similarly, the aforementioned information should also be transmitted in a multiple-input-multiple-output (MIMO) OFDM frame such that a receiver is able to separate the various information pertaining to the transmit chain subframes of the frame to perform independent AGC, parallel FFT processing, and channel estimation/equalization of the received transmit chain subframes.

SUMMARY

Certain aspects of the present disclosure provide an apparatus for wireless communications. The apparatus includes a processing system configured to generate a frame comprising a first portion and a second portion, said first portion being decodable by a first device operating according to a first protocol, said second portion not being decodable by the first device, wherein the first and second portions are decodable by a second device operating according to a second protocol; and an interface configured to output the frame for transmission.

Certain aspects of the present disclosure provide a method for wireless communications. The method includes generating a frame comprising a first portion and a second portion, said first portion being decodable by a first device operating according to a first protocol, said second portion not being decodable by the first device, wherein the first and second portions are decodable by a second device operating according to a second protocol; and outputting the frame for transmission.

Certain aspects of the present disclosure provide an apparatus for wireless communications. The apparatus includes means for generating a frame comprising a first portion and a second portion, said first portion being decodable by a first device operating according to a first protocol, said second portion not being decodable by the first device, wherein the first and second portions are decodable by a second device operating according to a second protocol; and means for outputting the frame for transmission.

Certain aspects of the present disclosure provide a computer readable medium having instructions stored thereon for generating a frame comprising a first portion and a second portion, said first portion being decodable by a first device operating according to a first protocol, said second portion not being decodable by the first device, wherein the first and second portions are decodable by a second device operating according to a second protocol; and outputting the frame for transmission.

Certain aspects of the present disclosure provide a wireless node. The wireless node comprises at least one antenna; a processing system configured to generate a frame comprising a first portion and a second portion, said first portion being decodable by a first device operating according to a first protocol, said second portion not being decodable by the first device, wherein the first and second portions are decodable by a second device operating according to a second protocol; and an interface configured to output the frame for transmission via the at least one antenna.

Aspects of the present disclosure also provide various methods, means, and computer program products corresponding to the apparatuses and operations described above.

BRIEF DESCRIPTION OF THE DRAWINGS

FIG. 3A illustrates an exemplary frame or frame portion in accordance with certain aspects of the present disclosure.

FIG. 3B illustrates an exemplary Extended Directional Multigigabit (EDMG) Header in accordance with certain aspects of the present disclosure.

FIG. 11 illustrates a table of exemplary seeds for primitive polynomials used for generating pseudorandom binary sequences for various transmit chain and channel bonding configurations in accordance with certain aspects of the present disclosure.

DETAILED DESCRIPTION

Figure 1:
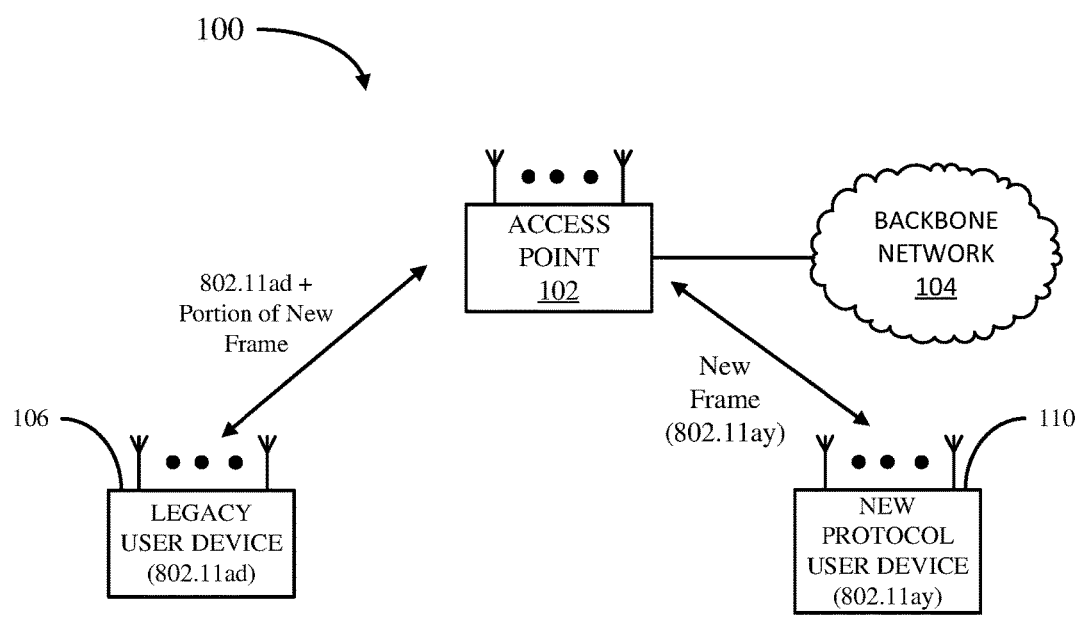
FIG. 1 is a diagram of an exemplary wireless communications network in accordance with certain aspects of the present disclosure.

Aspects of the present disclosure provide techniques for performing channel estimation of a bonded channel formed by bonding a plurality of channels by using channel estimation training sequences transmitted in each of the plurality of channels.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

With reference to the following description, it shall be understood that not only communications between access points and user devices are allowed, but also direct (e.g., peer-to-peer) communications between respective user devices are allowed. Furthermore, a device (e.g., an access point or user device) may change its behavior between a user device and an access point according to various conditions. Also, one physical device may play multiple roles: user device and access point, multiple user devices, multiple access points, for example, on different channels, different time slots, or both.

FIG. 1 illustrates a block diagram of an exemplary wireless communications network 100 in accordance with certain aspects of the present disclosure. The communications network 100 comprises an access point 102, a backbone network 104, a legacy user device 106, and a new protocol user device 110.

The access point 102, which may be configured for a wireless local area network (LAN) application, may facilitate data communications between the user devices 106 and 110. The access point 102 may further facilitate communications data communications between devices coupled to the backbone network 104 and any one or more of the user devices 106 and 110.

In this example, the access point 102 and the legacy user device 106 data communicate between each other using a legacy protocol. One example of a legacy protocol includes the Institute of Electrical and Electronics Engineers (IEEE) 802.11ad. According to this protocol, data communications between the access point 102 and the legacy user device 106 are effectuated via transmission of data frames that comply with the 802.11ad protocol. As discussed further herein, an 802.11ad data frame includes a preamble consisting of a short training field (L-STF) sequence and a channel estimation field (L-CEF) sequence, a header (L-Header), a payload data, and an optional beamforming training field.

The L-STF sequence includes a plurality of concatenated Golay sequences ($Ga_{128}$) followed by a negative Golay sequence ($-Ga_{128}$) to signify the end of the STF sequence. The L-STF sequence may assist a receiver in setting up its automatic gain control (AGC), timing, and frequency setup for accurately receiving the rest of the frame.

In the case of a single carrier (SC) transmission mode, the L-CEF includes a $Gu_{512}$ sequence (consisting of the following concatenated Golay sequences ($-Gb_{128}$, $-Ga_{128}$, $Gb_{128}$, $-Ga_{128}$)) followed by a $Gv_{512}$ sequence (consisting of the following concatenated Golay sequences ($-Gb_{128}$, $Ga_{128}$, $-Gb_{128}$, $-Ga_{128}$)), and ending with a $Gv_{128}$ (same as $-Gb_{128}$) sequence. In the case of an orthogonal frequency division multiplexing (OFDM) transmission mode, the L-CEF includes a $Gv_{512}$ sequence followed by a $Gu_{512}$ sequence, and ending with a $Gv_{128}$ sequence. The L-CEF assists a receiver in estimating the transfer function or frequency response of a channel through which a data frame is transmitted.

The L-Header in the 802.11ad data frame includes information about the frame. Such information includes a scrambler initiation field, which specifies a seed for the scrambling applied to the remainder of the header and the payload data for data whitening purposes. The L-Header also includes the modulation and coding scheme (MCS) field to indicate one out of 12 defined MCS used for transmitting the data payload portion of the frame. The L-Header includes a length field to indicate the length of the data payload in octets. The L-Header further includes a training length field to indicate a length of the optional beam forming training sequence at the end of the frame. Additionally, the L-Header includes a packet type field to indicate whether the optional beam forming field pertains to transmission or reception. Further, the L-Header includes a header checksum (HCS) field to indicate a cyclic redundancy code (CRC) (e.g., CRC-32) checksum over the header bits.

Referring again to FIG. 1, the legacy user device 106 is capable of decoding the entire 802.11ad data frame. The new frame disclosed herein, which may be subsequently adopted for a new standard or protocol, such as the currently-in-development IEEE 802.11ay, provides some backward compatibility feature. As discussed in more detail herein, the new frame includes the preamble (the L-STF and the L-CEF) and the L-Header of the 802.11ad, but also additional portions pertaining to the proposed new protocol. Accordingly, the legacy user device 106 is configured to decode the L-STF, L-CEF, and L-Header fields of the new frame, but is not configured to decode the remaining portion of the new frame. The legacy user device 106 may decode the data in the length field of the L-Header of the new frame in order to calculate a network allocation vector (NAV) to determine the length of the new frame for transmission collision avoidance purposes as both legacy user devices and new protocol devices use the same channels for transmission.

The new protocol user device 110 is capable of communicating with the access point 102 using the new data frame, which some or all features of the new frame may be adopted for the currently-under-development 802.11ay protocol. As discussed further herein, the new data frame includes the legacy the L-STF, L-CEF, and L-Header fields. In addition to the legacy fields, the new frame further comprises an Extended Directional Multigigabit (EDMG) Header. As discussed in more detail herein, the EDMG Header comprises a plurality of fields for indicating various attributes for the new frame. Such attributes includes payload data length, number of low density parity check (LDPC) data blocks appended to the EDMG Header, the number of spatial streams, the number of bonded channels, the leftmost (lowest frequency) channel of the bonded channels, the modulation coding scheme (MCS) for the data payload of the new frame, and other information. As mentioned above, the EDMG Header may further be appended with payload data that is not in the data payload portion of the new frame. For short messages, the entire payload data may appended to the EDMG Header; thereby avoiding the need for transmitting the "separate" data payload portion of the new frame, which adds significant overhead to the frame.

The new data frame is configured to provide additional features to improve data throughput by employing higher data modulation schemes, channel bonding, and improved spatial transmission via multiple input multiple output (MIMO) antenna configurations. For instance, the legacy 802.11ad protocol includes BPSK, QPSK, and 16QAM available modulation schemes. According to the new protocol, higher modulation schemes, such as 64QAM, 64APSK, 128APSK, 256QAM, and 256APSK are available. Additionally, a plurality of channels may be bonded to increase data throughput. Further, such bonded channels may be transmitted by way of a plurality of spatial transmissions using a MIMO antenna configuration.

Figure 2:
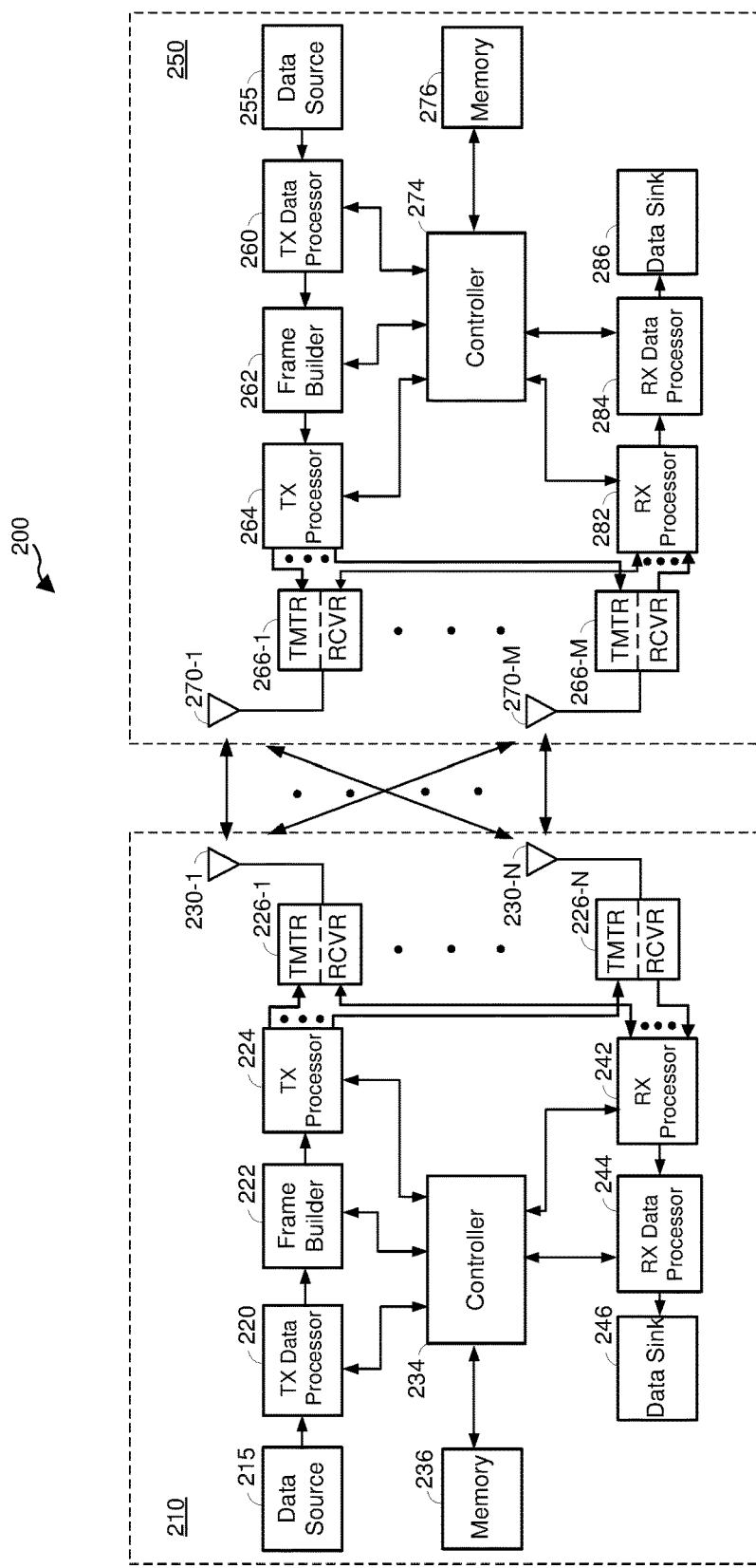
FIG. 2 illustrates a block diagram of an access point (generally, a first wireless node) and a user device (generally, a second wireless node) in accordance with certain aspects of the present disclosure.

FIG. 2 illustrates a block diagram of a wireless communication network 200 including an access point 210 (generally, a first wireless node) and a user device 250 (generally, a second wireless node). The access point 210 is a transmitting entity for the downlink and a receiving entity for the uplink. The user device 250 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel.

It shall be understood that the access point 210 may alternatively be a user device, and the user device 250 may alternatively be an access point.

For transmitting data, the access point 210 comprises a transmit data processor 220, a frame builder 222, a transmit processor 224, a plurality of transceivers 226-1 to 226-N, and a plurality of antennas 230-1 to 230-N. The access point 210 also comprises a controller 234 for controlling operations of the access point 210.

In operation, the transmit data processor 220 receives data (e.g., data bits) from a data source 215, and processes the data for transmission. For example, the transmit data processor 220 may encode the data (e.g., data bits) into encoded data, and modulate the encoded data into data symbols. The transmit data processor 220 may support different modulation and coding schemes (MCSs). For example, the transmit data processor 220 may encode the data (e.g., using low-density parity check (LDPC) encoding) at any one of a plurality of different coding rates. Also, the transmit data processor 220 may modulate the encoded data using any one of a plurality of different modulation schemes, including, but not limited to, BPSK, QPSK, 16QAM, 64QAM, 64APSK, 128APSK, 256QAM, and 256APSK.

In certain aspects, the controller 234 may send a command to the transmit data processor 220 specifying which modulation and coding scheme (MCS) to use (e.g., based on channel conditions of the downlink), and the transmit data processor 220 may encode and modulate data from the data source 215 according to the specified MCS. It is to be appreciated that the transmit data processor 220 may perform additional processing on the data such as data scrambling, and/or other processing. The transmit data processor 220 outputs the data symbols to the frame builder 222.

The frame builder 222 constructs a frame (also referred to as a packet), and inserts the data symbols into a payload data of the frame. The frame may include a legacy preamble (e.g., L-STF and L-CEF), a legacy L-Header, an EDMG Header, a new protocol preamble (e.g., EDMG STF-A, EDMG STF-B, and EDMG STF-CEF), a data payload, and an optional beam training sequence (TRN). The legacy preamble may include the legacy short training field (L-STF) sequence and the legacy channel estimation field (L-CEF) to assist the user device 250 in receiving the frame. The L-Header and EDMG Header may include information related to the data in the payload such as the length of the data and the MCS used to encode and modulate the data. This information allows the user device 250 to demodulate and decode the data. The new protocol preamble fields, EDMG STF-A, EDMG STF-B, and EDMG CEF, assists a receiver in automatic gain control (AGC) of its front end, setting up a timing window for inputting samples into an Fast Fourier Transform (FFT), and estimating a frequency response of a channel through which the frame is received. The data in the payload may be divided among a plurality of blocks, wherein each block may include a portion of the data and a guard interval (GI) to assist the receiver with phase tracking. The frame builder 222 outputs the frame to the transmit processor 224.

The transmit processor 224 processes the frame for transmission on the downlink. For example, the transmit processor 224 may support different transmission modes such as an orthogonal frequency-division multiplexing (OFDM) transmission mode. In this example, the controller 234 may send a command to the transmit processor 224 specifying which transmission mode to use, and the transmit processor 224 may process the frame for transmission according to the specified transmission mode. The transmit processor 224 may apply a spectrum mask to the frame so that the frequency constituent of the downlink signal meets certain spectral requirements.

In certain aspects, the transmit processor 224 may support multiple-output-multiple-input (MIMO) transmission. In these aspects, the access point 210 may include multiple antennas 230-1 to 230-N and multiple transceivers 226-1 to 226-N (e.g., one for each antenna). The transmit processor 224 may perform spatial processing on the incoming frames and provide a plurality of transmit streams for the plurality of antennas. The transceivers 226-1 to 226-N receive and processes (e.g., converts to analog, amplifies, filters, and frequency upconverts) the respective transmit frame streams to generate distinct spatially-diverse transmit signals for transmission via the antennas 230-1 to 230-N, respectively.

For transmitting data, the user device 250 comprises a transmit data processor 260, a frame builder 262, a transmit processor 264, a plurality of transceivers 266-1 to 266-M, and a plurality of antennas 270-1 to 270-M (e.g., one antenna per transceiver). The user device 250 may transmit data to the access point 210 on the uplink, and/or transmit data to another user device (e.g., for peer-to-peer communication). The user device 250 also comprises a controller 274 for controlling operations of the user device 250.

In operation, the transmit data processor 260 receives data (e.g., data bits) from a data source 255, and processes (e.g., encodes and modulates) the data for transmission. The transmit data processor 260 may support different MCSs. For example, the transmit data processor 260 may encode the data (e.g., using LDPC encoding) at any one of a plurality of different coding rates, and modulate the encoded data using any one of a plurality of different modulation schemes, including, but not limited to, BPSK, QPSK, 16QAM, 64QAM, 64APSK, 128APSK, 256QAM, and 256APSK. In certain aspects, the controller 274 may send a command to the transmit data processor 260 specifying which MCS to use (e.g., based on channel conditions of the uplink), and the transmit data processor 260 may encode and modulate data from the data source 255 according to the specified MCS. It is to be appreciated that the transmit data processor 260 may perform additional processing on the data. The transmit data processor 260 outputs the data symbols to the frame builder 262.

The frame builder 262 constructs a frame, and inserts the received data symbols into a payload data of the frame. The frame may include the legacy preamble (L-STF and L-CEF), the legacy L-Header, the EDMG Header, the new protocol preamble (EDMG STF-A, EDMG STF-B, and EDMG CEF, a data payload, and an optional beam training sequence (TRN). The legacy and the new protocol preamble assist the access point 210 and/or other user device in receiving the frame. The L-Header and EDMG Header may include information related to the data in the payload such as the length of the data and the MCS used to encode and modulate the data. The data in the payload may be divided among a plurality of blocks where each block may include a portion of the data and a guard interval (GI) assisting the access point and/or other user device with phase tracking. The frame builder 262 outputs the frame to the transmit processor 264.

The transmit processor 264 processes the frame for transmission. For example, the transmit processor 264 may support different transmission modes such as an OFDM transmission mode and an WB SC transmission mode. In this example, the controller 274 may send a command to the transmit processor 264 specifying which transmission mode to use, and the transmit processor 264 may process the frame for transmission according to the specified transmission mode. The transmit processor 264 may apply a spectrum mask to the frame so that the frequency constituent of the uplink signal meets certain spectral requirements.

The transceivers 266-1 to 266-M receive and processes (e.g., converts to analog, amplifies, filters, and frequency upconverts) the output of the transmit processor 264 for transmission via the one or more antennas 270-1 to 270-M. For example, the transceiver 266-1 to 266-M may upconvert the output of the transmit processor 264 to a transmit signal having a frequency in the 60 GHz range.

In certain aspects, the transmit processor 264 may support multiple-output-multiple-input (MIMO) transmission. In these aspects, the user device 250 may include multiple antennas 270-1 to 270-M and multiple transceivers 266-1 to 266-M (e.g., one for each antenna). The transmit processor 264 may perform spatial processing on the incoming frame and provide a plurality of transmit frame streams for the plurality of antennas 270-1 to 270-M. The transceivers 266-1 to 266-M receive and process (e.g., converts to analog, amplifies, filters, and frequency upconverts) the respective transmit frame streams to generate distinct spatially-diverse transmit signals for transmission via the antennas 270-1 to 270-M.

For receiving data, the access point 210 comprises a receive processor 242, and a receive data processor 244. In operation, the transceivers 226-1 to 226-N receive a signal (e.g., from the user device 250), and spatially process (e.g., frequency downconverts, amplifies, filters and converts to digital) the received signal.

The receive processor 242 receives the outputs of the transceivers 226-1 to 226-N, and processes the outputs to recover data symbols. For example, the access point 210 may receive data (e.g., from the user device 250) in a frame. In this example, the receive processor 242 may detect the start of the frame using the legacy L-STF sequence in the preamble of the frame. The receiver processor 242 may also use the L-STF and/or the EDMG STF-A for automatic gain control (AGC) adjustment. The receiver processor 242 may also use the EDMG STF-B for setting and maintaining the proper time window for inputting samples of the received signal into an FFT for processing. The receive processor 242 may also perform channel estimation (e.g., using the legacy L-CEF and/or new protocol EDMG CEF fields of the frame) and perform channel equalization on the received signal based on the channel estimation.

Further, the receive processor 242 may estimate phase noise using the guard intervals (GIs) in the payload, and reduce the phase noise in the received signal based on the estimated phase noise. The phase noise may be due to noise from a local oscillator in the user device 250 and/or noise from a local oscillator in the access point 210 used for frequency conversion. The phase noise may also include noise from the channel. The receive processor 242 may also recover information (e.g., MCS scheme) from the header of the frame, and send the information to the controller 234. After performing channel equalization and/or phase noise reduction, the receive processor 242 may recover data symbols from the frame, and output the recovered data symbols to the receive data processor 244 for further processing.

The receive data processor 244 receives the data symbols from the receive processor 242 and an indication of the corresponding MSC scheme from the controller 234. The receive data processor 244 demodulates and decodes the data symbols to recover the data according to the indicated MSC scheme, and outputs the recovered data (e.g., data bits) to a data sink 246 for storage and/or further processing.

As discussed above, the user device 250 may transmit data using an OFDM transmission mode. In this case, the receive processor 242 may process the receive signal according to the OFDM transmission mode. Also, as discussed above, the transmit processor 264 may support multiple-output-multiple-input (MIMO) transmission. In this case, the access point 210 includes multiple antennas 230-1 to 230-N and multiple transceivers 226-1 to 226-N (e.g., one for each antenna). Each transceiver receives and processes (e.g., frequency downconverts, amplifies, filters, frequency upconverts) the signal from the respective antenna. The receive processor 242 may perform spatial processing on the outputs of the transceivers 226-1 to 226-N to recover the data symbols.

For receiving data, the user device 250 comprises a receive processor 282, and a receive data processor 284. In operation, the transceivers 266-1 to 266-M receive a signal (e.g., from the access point 210 or another user device) via the respective antennas 270-1 to 270-M, and process (e.g., frequency downconverts, amplifies, filters and converts to digital) the received signal.

The receive processor 282 receives the outputs of the transceivers 266-1 to 266-M, and processes the outputs to recover data symbols. For example, the user device 250 may receive data (e.g., from the access point 210 or another user device) in a frame, as discussed above. In this example, the receive processor 282 may detect the start of the frame using the legacy L-STF sequence in the preamble of the frame. The receive processor 282 may perform automatic gain control (AGC) using the legacy L-STF and/or the EDMG STF-A. The receiver processor 282 may also use the EDMG STF-B for setting and maintaining the proper time window for inputting samples of the received signal into an FFT for processing. The receive processor 282 may also perform channel estimation (e.g., using the legacy L-CEF and/or the new protocol EDMG CEF of the frame) and perform channel equalization on the received signal based on the channel estimation.

Further, the receive processor 282 may estimate phase noise using the guard intervals (GIs) in the payload, and reduce the phase noise in the received signal based on the estimated phase noise. The receive processor 282 may also recover information (e.g., MCS scheme) from the header of the frame, and send the information to the controller 274. After performing channel equalization and/or phase noise reduction, the receive processor 282 may recover data symbols from the frame, and output the recovered data symbols to the receive data processor 284 for further processing.

The receive data processor 284 receives the data symbols from the receive processor 282 and an indication of the corresponding MSC scheme from the controller 274. The receive data processor 284 demodulates and decodes the data symbols to recover the data according to the indicated MSC scheme, and outputs the recovered data (e.g., data bits) to a data sink 286 for storage and/or further processing.

As discussed above, the access point 210 or another user device may transmit data using an OFDM transmission mode. In this case, the receive processor 282 may process the receive signal according to the OFDM transmission mode. Also, as discussed above, the transmit processor 224 may support multiple-output-multiple-input (MIMO) transmission. In this case, the user device 250 may include multiple antennas and multiple transceivers (e.g., one for each antenna). Each transceiver receives and processes (e.g., frequency downconverts, amplifies, filters, frequency upconverts) the signal from the respective antenna. The receive processor 282 may perform spatial processing on the outputs of the transceivers to recover the data symbols.

As shown in FIG. 2, the access point 210 also comprises a memory 236 coupled to the controller 234. The memory 236 may store instructions that, when executed by the controller 234, cause the controller 234 to perform one or more of the operations described herein. Similarly, the user device 250 also comprises a memory 276 coupled to the controller 274. The memory 276 may store instructions that, when executed by the controller 274, cause the controller 274 to perform the one or more of the operations described herein.

Frame Format Common to the Enhanced Frames

FIG. 3A illustrates a diagram of an exemplary frame or frame portion 300 in accordance with certain aspects of the disclosure. As described herein, all of the frame formats described herein start with the legacy (e.g., 802.11ad) fields: L-STF, L-CEF, and L-Header. These fields may be decodable by legacy user devices and new protocol devices (e.g., access points and user devices). After the legacy fields, the transmission includes one or more various fields that may be part of the new protocol (e.g., the currently-being-developed 802.11ay protocol, also known as "NG60"). The new protocol options of the frame or frame portion 300 start with an Extended Directional Multigigabit (EDMG) Header with optional appended payload data. Legacy devices may not able to decode the EDMG Header, but new protocol devices are able to decode the EDMG Header.

According to the diagram, the x- or horizontal axis represents time, and the y- or vertical axis represents frequency. For legacy (e.g., 802.11ad) protocol backwards compatibility purposes, the legacy L-STF of the frame 300 may have a duration of 1.16 microseconds (μs), the legacy L-CEF portion may have a duration of 0.73 ns, and the legacy L-Header portion may have a duration of 0.58 μs. The EDMG Header may have a duration of 0.29 μs or more. In the case that the frame 300 is a full frame (not a frame portion), the frame 300 may be transmitted via a single frequency legacy channel and include payload data appended to the EDMG Header. Such configuration may be useful for short messages because there is no need for a separate payload data according to the new frame format, which may consume overhead for the transmission.

The legacy L-Header specifies various parameters and may be decoded by all stations (legacy devices, new protocol devices, and access points) that are in range. These stations listen when they are waiting to receive a message or prior to transmission. The legacy L-Header specifies the modulation coding scheme (MCS) used in the data transmission and the amount of data that is transmitted. Stations use these two values to compute the entire duration length of any of the new frames described herein (e.g., including the L-STF, L-CES, L-Header, EDMG Header, EDMG STF-A (if included), EDMG STF-B (if included), EDMG CEF (if included), and payload data (if included), but excluding the TRN field) to update the network allocation vector (NAV). This is a mechanism that allows stations to know that the medium is going to be used by another device (e.g., an access point or user device), even if they cannot decode the data itself, or even if they are not the intended receiver of the message. The use of NAV is one of the mechanisms to avoid transmitted signal collisions.

In the legacy 802.11ad frame format, data is placed in low density parity check (LDPC) blocks, where the size is according to the code rate, then encoded to a fixed length blocks (e.g., 672 bits). The outcome is concatenated and then split into Fast Fourier Transform (FFT) blocks (blocks of modulation symbols) according to the selected MCS (mainly modulation). At a receiver, the process is reversed. It should be noted that in low data MCSs, one LDPC block will require one or more FFT blocks, while in high data MCSs, one FFT block may host more than one LDPC blocks. This discussion is relevant to the placing of LDPC data appended to the EDMG Header, as described in more detail herein.

FIG. 3B illustrates an exemplary EDMG Header 350 of the frame or frame portion 300 in accordance with certain aspects of the present disclosure. The EDMG Header specifies the transmission frame parameters (MCS, Data length, modes, etc.) that are used by a receiver to be able to receive and decode the transmission frame. There is no need for other stations (not the destination station) to demodulate the EDMG Header. Hence, the EDMG Header and appended data can be transmitted at high MCS that is suitable for the destination station.

The EDMG Header 350 comprises: (1) a Payload data Length field that may include 24 bits to specify the length of the payload data in octets in all concurrent channels, regardless of whether the payload data is appended to the EDMG Header or in the separate payload data portion; (2) an EDMG Header Number of LDPC blocks field that may include 10 bits to specify the number of LDPC data blocks appended to the EDMG Header. When this value is zero (0), it means there is one (1) LDPC block of data in the EDMG Header; (3) a Spatial streams field that may include 4 bits to represent the number (e.g., 1 to 16) of spatial streams that are being transmitted; (4) a Channels field that may include 3 bits to specify the number of bonded channels (e.g., one (1) to (8) 802.11ad frequency channels (as well as additional channels not available in 802.11ad)); and (5) a Channel offset field that may include 3 bits to specify the offset of the first channel of the bonded channels. In other words, the Channel offset identifies the lowest frequency channel among the bonded channels. This value is set to zero (0) when the first channel is the lowest frequency channel among all the available channels, or when only one channel is used (i.e., no channel bonding).

The EDMG Header 350 further comprises: (6) an 11ay MCS field that may include 6 bits to specify the MCS used in the payload data portion of a frame. Note that the data appended to the EDMG Header uses only the legacy 802.11ad MCS (and not the higher MCS that are only available in accordance with the new protocol). The new protocol MCS may include higher throughput modulation schemes beyond those available in 802.11ad, such as 64QAM, 64APSK, 256QAM, and 256 APSK; (7) a GI (Guard Interval) mode field that may include 1 bit to indicate short or long GI. (8) an FFT mode field that may include 1 bit to indicate short or long FFT block. (9) an LDPC mode field that may include 1 bit to signal short or long LDPC block. And (10) a Long CEF field that may include 1 bit that, when set, indicates the use of a long channel estimation sequence for MIMO; in the case that the number of spatial streams is one, this bit is reserved.

The EDMG Header 350 further comprises: (11) Reserved bits that may include 26 bits that are reserved at this time. Transmitters should set them to 0 at this time. In the future, these bits may be allocated to various needs; (12) Proprietary bits that may include 8 spare bits that can be used by the vendor and do not require interoperability. Receivers should discard these bits unless they know what they are; and (13) a CRC field that may include 16 bits to sign the EDMG Header. This field is to be used by a receiver to validate the correctness of the received EDMG Header. All bits (except the CRC) shall be used to compute the CRC.

The EDMG Header 350 may be sent on each concurrently-transmitted channel having exactly the same content. This duplication can be used by a receiver to increase the correct detection probability. A receiver may use different algorithms: Option1: receiver decodes only one channel (simples but lowest performance); Option2: receiver decodes only one channel at the time. If CRC passes then cease CRC processing for additional channel(s), if not attempt CRC processing for additional channel(s). Option 2 is better at performance than Option 1, but requires serial processing; and Option3: receiver decodes all channels and selects one that has the corrected CRC. Option 3 has the same performance as Option 2, but is faster.

Frame Format for Single-Channel OFDM

Figure 4:
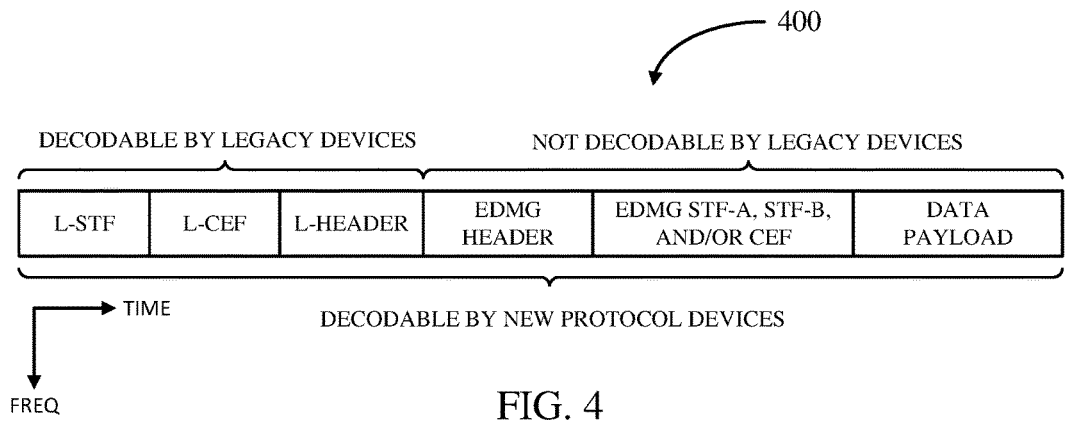
FIG. 4 illustrates an exemplary single-channel frame in accordance with certain aspects of the present disclosure.

FIG. 4 illustrates an exemplary single-channel OFDM frame 400 in accordance with certain aspects of the present disclosure. The OFDM frame 400 should maintain the legacy 802.11ad preamble (L-STF and L-CEF) and L-Header as a prefix in order to be backwards compliant. Thus, the legacy portion of the frame L-STF, L-CEF, and L-Header are decodable by devices operating in accordance with the legacy 802.11ad protocol, as well as devices operating in accordance with a new protocol, which could be the currently-in-development 802.11 ay protocol. The EDMG Header, EDMG STF-A, EDMG STF-B, EDMG CEF, and the data payload are decodable by devices operating in accordance with the new protocol, but not devices operating in accordance with the legacy 802.11ad protocol.

In the case of the single-channel OFDM frame 400, the EDMG STF-A is configured to assist a transmitter and/or receiver of the frame in automatic gain control (AGC) of its front end components (e.g., power amplifier (PA) and low noise amplifier LNA, respectively). Since the EDMG STF-A is transmitted via the same frequency channel as the legacy L-STF, the EDMG STF-A may be optional as the transmitter and/or receiver may perform AGC using the legacy L-STF. The EDMG STF-B is configured to assist a receiver to setup and maintain the proper time window for inputting samples of the received signal into an FFT for processing. Similarly, since the EDMG STF-B is transmitted via the same frequency channel as the legacy L-STF, the EDMG STF-B may be optional as the receiver may perform the aforementioned timing operation using the legacy L-STF. The EDMG CEF is configured to assist a receiver in estimating the impulse response of a channel through which the frame 400 is received, and performing equalization on the received signal based on the channel estimation. Similarly, since the EDMG CEF is transmitted via the same frequency channel as the legacy L-CEF, the EDMG CEF may be optional as the receiver may perform the aforementioned channel estimation using the legacy L-CEF.

A single channel may keep the 802.11ad set of 336 data subcarriers. Channels spacing may be set to 420 subcarriers. Alternatively, channels spacing may be set to 418 subcarriers.

EDMG STF-A

As discussed above, the EDMG STF-A is configured to be used by a transmitter to perform automatic gain control (AGC) of the transmitter's front end (e.g., the power amplifier (PA)) and used by a receiver to perform AGC at the receiver's front end (e.g., the low noise amplifier (LNA)). According to an aspect of the disclosure, the EDMG STF-A is configured as frequency-domain pseudorandom binary sequence (PRBS) data transmitted via subcarriers of an OFDM transmission of the corresponding frame.

The purpose of configuring the EDMG STF-A to include the frequency-domain PRBS data is that the corresponding OFDM transmission (e.g., after taking the inverse Fast Fourier Transform (IFFT) of the frequency-domain PRBS data) has a peak-to-average-power-ratio (PAPR) that is more representative of the PAPR of the OFDM transmission of the data payload. Thus, using the frequency-domain PRBS data for performing AGC at the transmitter facilitates the configuring of the power amplifier (PA) to operate in a desirable linearity region when transmitting the payload data. This improves power efficiency at the transmitter and signal quality of the payload data at the receiver. Similarly, using the frequency-domain PRBS data for performing AGC at the receiver facilitates configuring of the low noise amplifier (LNA) to operate in a desirable linearity region to minimize distortion of the received signal by the LNA.

Pilots, such as Golay sequences, are particularly configured to have low PAPR; and thus, are not a good representative of the PAPR of the payload data. Accordingly, performing AGC based on pilots may result in the transmitter power amplifier and receiver LNA to be set with too high of a gain. As a result, when the power amplifier and/or the LNA are amplifying data, it is highly likely that they will be operated in an undesirable non-linear region, which may result in distorted transmitted and received signal.

The frequency-domain PRBS data of the EDMG STF-A may be transmitted in parallel via non-zero subcarriers for one or more OFDM symbol intervals of an OFDM transmission. The frequency-domain PRBS data of the EDMG STF-A may be spatially pre-coded using the spatial Q-matrix for MIMO transmissions, and pre-coded via the rotation γ-matrix for reduced PAPR. Additionally, cyclic prefix (CP) may be applied to the corresponding time-domain (IFFT) symbols and windowing to smooth the transitions between symbols. The frequency-domain PRBS data may be modulated using 16 quadrature amplitude modulation (QAM) or other type of modulation. The frequency-domain PRBS data is known a priori by the receiver.

For MIMO transmission, the frequency-domain PRBS data pertaining to a first transmit chain subframe may be configured to have low cross-correlation with another frequency-domain PRBS data transmitted in a time-aligned manner in a second transmit chain subframe to prevent or reduce the likelihood of unintentional beamforming during transmission and reception of the corresponding frame. This eliminates the need for time offsetting (i.e., cyclic delaying or shifting) the transmissions of the frequency-domain PRBS data in both transmit chain subframes with respect to each other. Cyclic delay or shift is undesirable because it may not be long enough to account for the delay spread associated with the channel, which may lead to error in decoding multi-path signals at a receiver.

The frequency-domain PRBS data may be generated based on a particular primitive polynomial. For example, the particular primitive polynomial used may be based on the number of bonded channels and the number of transmit chain subframes. For example, the following provides examples of particular primitive polynomials that may be used for single channel (CB=1) and various channel bonding configurations (CB=2 (two channels bonded), CB=3 (three channel bonded), and CB=4 (four channel bonded)):

CB=1: $x^9+x^4+x^0$

CB=2: $x^{10}+x^3+x^0$

CB=3: $x^{11}+x^2+x^0$

CB=4: $x^{11}+x^2+x^0$

It shall be understood that these particular primitive polynomials are merely examples, and others may be used for the various channel bonding configurations.

FIG. 11 illustrates a table of exemplary seeds for primitive polynomials used for generating the frequency-domain PRBS data for various transmit chain subframes and channel bonding configurations in accordance with certain aspects of the present disclosure. The left-most column represents the transmit chain index from zero (0) to 11, where index zero (0) represents a single transmit chain subframe and index 11 represents 12 transmit chain subframes. To the right of the transmit chain index column are four columns representing the channel bonding configurations CB=1, CB=2, CB=3, and CB=4.

Each entry in the table corresponding to a particular transmit chain index and a particular channel bonding configuration represents a particular seed for a particular primitive polynomial. For example, for transmit chain index 0 and channel bonding CB=1, the seed is 3 for primitive polynomial $x^9+x^4+x^0$. Per another example, for transmit chain index 4 and channel bonding CB=2, the seed is 51 for primitive polynomial $x^{10}+x^3+x^0$. Per yet another example, for transmit chain index 8 and channel bonding CB=3, the seed is 230 for primitive polynomial $x^{11}+x^2+x^0$. And, per still another example, for transmit chain index 11 and channel bonding CB=4, the seed is 657 for primitive polynomial $x^{11}+x^2+x^0$. Note that the particular primitive polynomial for channel bonding configuration CB=3 is the same for channel bonding configuration CB=4. Accordingly, the seeds in each row for the CB=3 and CB=4 configurations should be different. It shall be understood that the particular seeds in the table of FIG. 11 are merely examples.

EDMG STF-B

The EDMG STF-B is configured to assist a receiver in the timing control for selection of a window of samples of a received signal for inputting into a Fast Fourier Transform (FFT) for processing in parallel to generate corresponding frequency-domain samples of the received signal. The EDMG STF-B is configured as a time-domain sequence having a length of substantially one OFDM symbol interval per single-channel transmission. As an example, the time-domain sequence may be configured as a Golay sequence. The time-domain sequence is known a priori by the receiver. The time-domain sequence allows the receiver to determine the start of the sequence and the end of the sequence. Since the length of the time-domain sequence is configured to be one OFDM symbol interval, the receiver is able to accurately set the following FFT time windows for every OFDM symbol interval following the time-domain sequence interval.

For MIMO applications, a pair of orthogonal time-domain sequences is transmitted in a time-aligned manner in each pair of transmit chain subframes, respectively. This allows a receiver to separate the time-domain sequences to set the corresponding FFT input sample windows for the pair of received OFDM data subframes so that the pair of data subframes are subjected to FFT processing in parallel. Since each of the orthogonal time-domain sequences are subjected to a different channel input response (CIR), the CIR of each transmit chain subframe is taken into account by the receiver in setting the corresponding FFT sample window.

As will be discussed in more detail further herein, in the case of a frame including three (3) transmit chain subframes, a pair of orthogonal time-domain sequences for two of the transmit chain subframes are sent in one OFDM symbol interval, and a single time-domain sequence is sent in another OFDM symbol interval. In the case of four (4) transmit chain subframes, a pair of orthogonal time-domain sequences for two of the transmit chain subframes are sent in one OFDM symbol interval, and another pair of orthogonal time-domain sequences is sent in another OFDM symbol interval.

The length of the time-domain sequence may be proportional to the number of bonded channels in each subframe. As an example, for a channel bonding of one (1) (e.g., single channel), the time-domain sequence basis Sg may be configured into the following concatenated blocks of Golay sequences and a partial (clipped) block of Golay sequence:

Sg={Ga128, Gb128, Ga128, Gb128(1:43)} where Gb128(1:43) is the first 43 complex elements of the Gb128 sequence block.

For a channel bonding of two (CB=2), the time-domain sequence basis Sg may be configured into the following concatenated blocks of Golay sequences and a partial (clipped) block of Golay sequence:

Sg={Ga256, Gb256, Ga256, Gb256(1:86)} where Gb256(1:86) is the first 86 complex elements of the Gb256 sequence block.

For a channel bonding of three (CB=3), the time-domain sequence basis Sg may be configured into the following concatenated blocks of Golay sequences:

Sg={Ga256, Gb256, Ga256, Gb256, Ga256}

For a channel bonding of four (CB=4), the time-domain sequence basis Sg may be configured into the following concatenated blocks of Golay sequences and a partial (clipped) block of Golay sequence:

Sg={Ga512, Gb512, Ga512, Gb512(1:171)} where Gb512(1:171) is the first 171 complex elements of the Gb512 sequence block.

The following provides an example of a pair of orthogonal Golay sequences that may be used for the EDMG STF-B field:

$$Sg1(n) = Sg(n) \cdot \exp\left(j \cdot \frac{\pi}{2} \cdot n\right)$$

$$Sg2(n) = j \cdot conj(Sg(n))$$

where n is the element index of the sequence, $$\exp\left(j \cdot \frac{\pi}{2} \cdot n\right)$$

is a conjugate element rotator, and j·conj is the complex conjugate operation. As is discussed in more detail herein, the orthogonal sequences Sg1(n) and Sg2(n) are transmitted in a time aligned manner for an entire duration of an OFDM symbol interval in a pair of transmit chain subframes, respectively. For a single transmit chain subframe (or for the non-paired transmit chain subframe of a frame consisting of an odd number of transmit chain frames), either Sg1($n$) or Sg2($n$) may be transmitted during an entire duration of an OFDM symbol interval.

In order for each of the sequences Sg1($n$) and Sg2($n$) to occupy an entire duration of an OFDM symbol interval, the sequence may be up-sampled by, for example, a square root raised cosine (SRRC) up-sampling process. For example, for channel bonding of one (CB=1) at a frequency of 2.64 GHz, the sequence may be up-sampled to 640 samples by SRRC. For example, for channel bonding of two (CB=2) at a frequency of 5.28 GHz, the sequence may be up-sampled to 1280 samples by SRRC. For example, for channel bonding of three (CB=3) at a frequency of 7.92 GHz, the sequence may be up-sampled to 1920 samples by SRRC. And, for example, for channel bonding of one (CB=4) at a frequency of 10.56 GHz, the sequence may be up-sampled to 2560 samples by SRRC. The transmit power of each sequence may be configured to be at a particular power level, such as the nominal (average) of the transmitted power of the frame or subframe.

EDMG CEF

The EDMG CEF is configured to assist a receiver to perform channel estimation and corresponding equalization for each transmit chain subframe. The EDMG CEF may be configured as a set of frequency-domain pilots (symbols known a priori by the receiver) transmitted via non-zero subcarriers of an OFDM transmission, respectively. Each pilot symbol may either be a +1 or $$-1(\tfrac{\pi}{2} - BPSK)$$

symbol. The set of frequency-domain pilots may be configured to produce an OFDM transmission (after performing an IFFT) with a PAPR at or below a particular threshold for a single channel (e.g., such as at or below 4 dB). This facilitates the transmission of the frequency-domain pilots at a more linear region of a transmitter power amplifier (PA) so as to minimize distortion of the frequency-domain pilots due to compression or non-linearity of the PA. The frequency-domain pilots may be processed using a rotation γ-matrix for reduced PAPR, processed to include cyclic prefixes (120 samples per channel bonding (=128*CB)) for each symbol after IFFT, and windowing after addition of the cyclic prefix to smooth the transmission between adjacent time-domain symbols.

For MIMO applications (more than one transmit chain subframe), the EDMG CEFs for the two or more transmit chain subframes are transmitted in a time-aligned manner (i.e., no cyclic delay or shift between the transmission of the EDMG CEFs). The sets of frequency-domain pilots of the EDMG CEF may be subjected to spatial Q-matrix processing with a dimension of $N_{TX}$ (number of transmit chain subframes) by $N_{STS,total}$ (total number of spatial streams), and by $N_{ST}$ (number of non-zero subcarriers). Additionally, each set of frequency-domain pilots of the EDMG CEF may be subjected to per-symbol-diversity processing using the P-matrix to allow a receiver to distinguish the EDMG CEFs of the transmit chain subframes. Examples of P-matrices for a transmit chain subframes of two, three, and four are as follows:

$$P_{2x2} = \begin{bmatrix} 1 & -1 \\ 1 & 1 \end{bmatrix}$$

$$P_{3x3} = \begin{bmatrix} 1 & -1 & 1 \\ 1 & -w_3^1 & -w_3^2 \\ 1 & -w_3^2 & w_3^4 \end{bmatrix} \text{ where } w_3 = \exp\left(-\frac{j2\pi}{3}\right)$$

$$P_{4x4} = \begin{bmatrix} 1 & -1 & 1 & 1 \\ 1 & 1 & -1 & 1 \\ 1 & 1 & 1 & -1 \\ -1 & -1 & 1 & 1 \end{bmatrix}$$

The columns of the P-matrix represent the transmit chain subframe dimension and the rows of the p-matrix represents the OFDM symbol interval dimension. The P-matrix operates on all frequency-domain pilots in parallel on a per subcarrier basis.

The number of frequency-domain pilot symbols transmitted per subcarrier transmitted may depend on the total number of spatial streams $N_{STSMAX}$. For example, the number of pilot symbols transmitted may be 1, 2, 3, 4, 6, 8 and 12. In particular, the number of pilot symbols may be the same or the greater (by the next available number of symbols) as the total number of spatial streams $N_{STSMAX}$. For example, the number of pilot symbols is four (4) for $N_{STSMAX}=4$. The number of pilot symbols is six (6) for $N_{STSMAX}=5$. For channel bonding, the bonded channel should look like a single channel with one or more frequency-domain pilots inserted in the gap between two channels that are bonded.

The frequency-domain pilots are based on empirically-determined sequence for low PAPR for a channel bonding of one (CB=1). The frequency-domain sequences for other channel bonding cases may be by duplication and empirically-determined additional pilots to fill all of frequency gaps between the channels. The duplication for channel bonding of greater than one (CB>1) includes processing the frequency-domain pilots via the rotation γ-matrix to reduce PAPR. The following provides examples for the various bonding cases:

For a single channel (CB=1), the frequency-domain pilots may be configured as follows:
 {Left, 0, 0, 0, Right}
where Left is the lower-frequency side sequence of 177 pilots, the 0,0,0 are the null subcarriers, and the Right is the higher-frequency side sequence of 177 pilots; wherein the Left sequence may be configured differently than the Right sequence so that the resulting PAPR is minimized or set to a desired low value.

For a channel bonding of two (CB=2), the frequency-domain pilots may be configured as follows:
 {Left•$\gamma_{1,2}$, 3P, Right•$\gamma_{1,2}$, 30P, 0, 0, 0, 30P, Left•$\gamma_{2,2}$, 3P, Right•$\gamma_{2,2}$}
where Left•$\gamma_{1,2}$ is the same Left sequence of 177 pilots in the CB=1 case rotated by a $\gamma_{1,2}$ matrix, 3P is 3 pilots, Right•$\gamma_{1,2}$ is the same Right sequence of 177 pilots as in the CB=1 case rotated by the $\gamma_{1,2}$ matrix, 30P is a set of 30 pilots, 0, 0, 0 are the null subcarriers, 30P is another set of 30 pilots, Left•$\gamma_{2,2}$ is the same Left sequence of 177 pilots in the CB=1 case rotated by a $\gamma_{2,2}$ matrix, 3P is 3 pilots, and Right•$\gamma_{2,2}$ is the same Right sequence of 177 pilots as in the CB=1 case rotated by a $\gamma_{2,2}$ matrix.

Note that the left 30 pilots, the null subcarriers 0,0,0, and the right 30 pilots are situated in the portion of the bonded channel coinciding with the gap frequency. Also, both sets of 30 pilots need not be the same, as well as both sets of 3 pilots need not be the same. These pilots are optimized to set the PAPR as desired.

For a channel bonding of three (CB=3), the frequency-domain pilots may be configured as follows:

{Left•$\gamma_{13}$, 3P, Right•$\gamma_{1,3}$, 63P, Left•$\gamma_{23}$, 0, 0, 0, Right•$\gamma_{2,3}$, 63P, Left•$\gamma_{3,3}$, 3P, Right•$\gamma_{3,3}$} where Left•$\gamma_{1,3}$ is the same Left sequence of 177 pilots in the CB=1 case rotated by a $\gamma_{13}$ matrix, 3P is 3 pilots, Right•$\gamma_{1,3}$ is the same Right sequence of 177 pilots as in the CB=1 case rotated by a $\gamma_{1,3}$ matrix, 63P is a set of 63 pilots, Left•$\gamma_{2,3}$ is the same Left sequence of 177 pilots in the CB=1 case rotated by a $\gamma_{2,3}$ matrix, 0, 0, 0 are the null subcarriers, Right•$\gamma_{2,3}$ is the same Right sequence of 177 pilots in the CB=1 case rotated by a $\gamma_{2,3}$ matrix, 63P is another set of 63 pilots, Left•$\gamma_{3,3}$ is the same Left sequence of 177 pilots as in the CB=1 case rotated by a $\gamma_{3,3}$ matrix, 3P is another 3 pilots, and Right•$\gamma_{33}$ is the same Right sequence of 177 pilots in the CB=1 case rotated by a $\gamma_{3,3}$ matrix.

Note that the 63 pilots on the lower frequency side and the 63 pilots on the upper frequency side coincide with the frequency band of the gaps. Also, both sets of 63 pilots need not be the same, as well as both sets of 3 pilots need not be the same. These pilots are optimized to set the PAPR as desired.

For a channel bonding of four (CB=4), the frequency-domain pilots may be configured as follows:

{Left•$\gamma_{1,4}$, 3P, Right•$\gamma_{1,4}$, 63P, Left•$\gamma_{24}$, 3P, Right•$\gamma_{2,4}$, 30P, 0, 0, 0, 30P, Left $\gamma_{3,4}$, 3P, Right•$\gamma_{3,4}$, 63P, Left•$\gamma_{4,4}$, 3P, Right•$\gamma_{4,4}$} where Left•$\gamma_{1,4}$ is the same Left sequence of 177 pilots in the CB=1 case rotated by a $\gamma_{1,4}$ matrix, 3P is 3 pilots, Right•$\gamma_{1,4}$ is the same Right sequence of 177 pilots as in the CB=1 case rotated by the $\gamma_{1,4}$ matrix, 63P is a set of 63 pilots, Left•$\gamma_{2,4}$ is the same Left sequence of 177 pilots in the CB=1 case rotated by a $\gamma_{2,4}$ matrix, 3P is another 3 pilot, Right•$\gamma_{2,4}$ is the same Right sequence of 177 pilots as in the CB=1 case rotated by the $\gamma_{2,4}$ matrix, 30P is a set of 30 pilots, 0, 0, 0 are the null subcarriers, 30P is another set of 30 pilots, Left•$\gamma_{3,4}$ is the same Left sequence of 177 pilots in the CB=1 case rotated by a $\gamma_{3,4}$ matrix, 3P is 3 pilots, Right•$\gamma_{3,4}$ is the same Right sequence of 177 pilots in the CB=1 case rotated by a $\gamma_{3,4}$ matrix, 63P is another set of 63 pilots, Left•$\gamma_{4,4}$ is the same Left sequence of 177 pilots in the CB=1 case rotated by a $\gamma_{4,4}$ matrix, 3P is another 3 pilots, and Right•$\gamma_{4,4}$ is the same Right sequence of 177 pilots in the CB=1 case rotated by a $\gamma_{4,4}$ matrix.

Note that the first 63P on the lower frequency side coincides with the lower-frequency gap, the 30P, 000, 30P coincides with the middle frequency gap, and the second 63P on the upper frequency side coincides with the upper frequency band of the gaps. Also, both sets of 63 pilots need not be the same, both sets of 30 pilots need not be the same, and all four sets of 3 pilots need not be the same. These pilots are optimized to set the PAPR as desired.

The above examples apply to the case where the channels spacing is set to 420 subcarriers per channel. For channels spacing of 418 subcarriers, replace 30P and 63P in the above examples with 29P and 61P, respectively.

As previously discussed, for a single channel (CB=1), the frequency-domain pilots may be configured to produce an OFDM transmission with a desired PAPR of 4 dB or lower. For a channel bonding of two (CB=2), the frequency-domain pilots may be configured to produce an OFDM transmission with a desired PAPR of 5.5 dB or lower. For a channel bonding of three (CB=3), the frequency-domain pilots may be configured to produce an OFDM transmission with a desired PAPR of 7.0 dB or lower. And, for a channel bonding of four (CB=4), the frequency-domain pilots may be configured to produce an OFDM transmission with a desired PARP of 8.5 dB or lower.

The Pad Field

As discussed further herein with respect to exemplary frames, the transmission of the legacy preamble (L-STF and L-CEF), the legacy header (L-Header), and the EDMG Header in the transmit chain subframes are offset (cyclic delayed or shifted) from each other by a time offset $\Delta T$. For example, the L-STF, L-CEF, L-Header, and EDMG Header for the first transmit chain subframe may be transmitted at time $t_0$, the L-STF, L-CEF, L-Header, and EDMG Header for the second transmit chain subframe may be transmitted at time $t_0 + \Delta T$. The L-STF, L-CEF, L-Header, and EDMG Header for the third transmit chain subframe may be transmitted at time $t_0 + 2\Delta T$. The reason for doing this is to prevent unintentional beamforming during the transmission of these portions of the respective transmits chain subframes.

However, as previously discussed, the respective EDMG STF-As of the transmit chain subframes are transmitted in a time-aligned manner (i.e., no cyclic shift); the respective EDMG STF-Bs of the transmit chain subframes are transmitted in a time-aligned manner (i.e., no cyclic shift); and the respective EDMG CEFs of the transmit chain subframes are transmitted in a time-aligned manner (i.e., no cyclic shift). Thus, in order to achieve the time alignment of the EDMG STF-As, EDMG STF-Bs, and EDMG CEF, pads are inserted between this portion and the L-STF, L-CEF, L-Header, and EDMG Header portion. The length of the pad field decreases for each transmit chain subframe that is subsequently transmitted. In one example, the pad field may be configured similar to a single-carrier-single-channel guard interval (GI) specified in the legacy 802.11ad protocol. For example, the pad field may comprise a Golay sequence with a length that may be truncated based on the required length for the pad field.

The following describes various frames that use the EDMG STF-A, EDMG STF-B, and EDMG CEF fields, as described above.

FIG. 4 illustrates an exemplary single-channel frame 400 in accordance with certain aspects of the present disclosure. As indicated, the x- or horizontal-axis represents the transmit time (earlier to the left, later to the right), and the y- or vertical-axis represents transmit channel frequency. The frame 400 comprises the legacy preamble and header fields (L-STF, L-CEF, and L-Header) that may be decodable by access points and user devices operating in accordance with the legacy protocol (e.g., 802.11ad).

As previously discussed, this is done so that legacy devices may decode this portion of the new frame 400 in order to calculate a Network Allocation Vector (NAV) so that they can determine the length of the frame 400 in order to determine when the frequency channel may be available. The new protocol devices (access points and user devices) operating in accordance with the new protocol (e.g., the currently-in-development 802.11ay) are also able decode the legacy portion (L-STF, L-CEF, and L-Header) of the frame 400.

The frame 400 further comprises the new protocol portion including the EDMG Header, at least one of the EDMG STF-A, EDMG STF-B, or EDMG CEF field, and the data payload. Although not shown, frame 400 (and the other frames 500, 600, 700, 800, 900, and 1000 described herein) may include a beam training field transmitted after the data payload for transmit and/or receive beamforming purposes. Devices (access points and user devices) operating in accordance with the new protocol may decode the EDMG Header, any of the EDMG STF-A, EDMG STF-B, or EDMG CEF field, and the data payload. However, these fields are not decodable by a device operating in accordance with the legacy protocol.

The various fields of the frame (L-STF, L-CEF, L-Header, EDMG Header, at least one of the EDMG STF-A, EDMG STF-B, or EDMG CEF, and data payload) are transmitted via the same frequency channel (e.g., a single 802.11ad frequency channel) in that time order. For the single-channel frame 400, the EDMG CEF may be optional as a receiver may use the L-CEF to perform channel estimation. Similarly, the EDMG STF-A may be optional as the transmitter and/or receiver may use the L-STF for performing automatic gain control (AGC). Similarly, the EDMG STF-B may be optional (however, more preferred) as the receiver may use the L-STF for setting up the input sample window for performing FFT processing.

Figure 5:
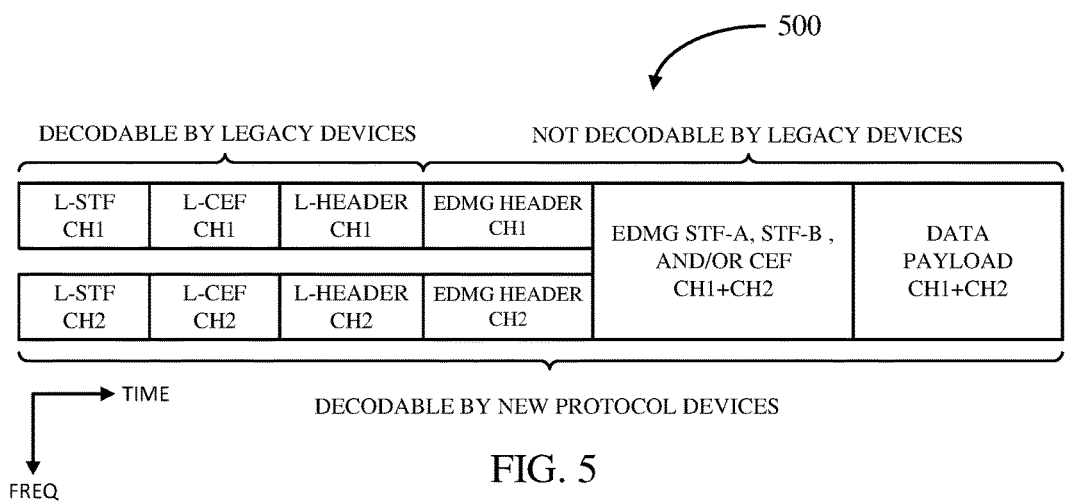
FIG. 5 illustrates an exemplary bonded-channel frame in accordance with certain aspects of the present disclosure.

FIG. 5 illustrates an exemplary channel bonded frame 500 in accordance with certain aspects of the present disclosure. In this example, the frame 500 is an example of a two channel bonded frame. Again, the x- or horizontal-axis represents the transmit time (earlier to the left, later to the right), and the y- or vertical-axis represents transmit channel frequency.

In particular, the frame 500 comprises the legacy portion for transmission via the first frequency channel (L-STF CH1, L-CEF CH1, and L-Header CH1), and the legacy portion for transmission via the second frequency channel (L-STF CH2, L-CEF CH2, and L-Header CH2). As illustrated, the L-STF CH1 and L-STF CH2 are transmitted in a substantially time-aligned manner (both having substantially the same start time, end time, and same length). Similarly, L-CEF CH1 and L-CEF CH2 are transmitted in a substantially time-aligned manner And, the L-Header CH1 and L-Header CH2 are transmitted in a substantially time-aligned manner. As illustrated, there is a frequency gap between the first frequency channel (CH1) and the second frequency channel (CH2). Again, these legacy portions may be decodable by both legacy devices and new protocol devices.

The frame 500 further comprises an EDMG Header CH1 for transmission via the first frequency channel CH1 and an EDMG Header CH2 for transmission via the second frequency channel CH2. The EDMG Header CH1 and the EDMG Header CH2 are configured for transmission in a time-aligned manner. The at least one of the EDMG STF-A, EDMGSTF-B, EDMG CEF, and the data payload fields are transmitted via a bonded frequency channel (CH1+CH2) including at least a portion of the first frequency channel (CH1) and at least a portion of the second frequency channel (CH2). It is noted that the bonded channel also includes the frequency gap between the first frequency channel CH1 and the second frequency channel CH2. The bonded channel (CH1+CH2) may be configured similar to a single channel (like that of frame 400). Accordingly, the gap frequency in the bonded channel (CH1+CH2) may be used to transmit symbols of the EDMG STF-A, EDMG CEF, and data payload, as well as the time-domain sequence of the EDMG STF-B. Devices (access points and user devices) operating in accordance with the new protocol may decode the EDMG Header CH1 and EDGM Header CH2, any of the EDMG STF-A, EDMG STF-B, or EDMG CEF fields of the bonded channel (CH1+CH2), and the data payload of the bonded channel (CH1+CH2). However, these fields are not decodable by a device operating in accordance with the legacy protocol.

Figure 6:
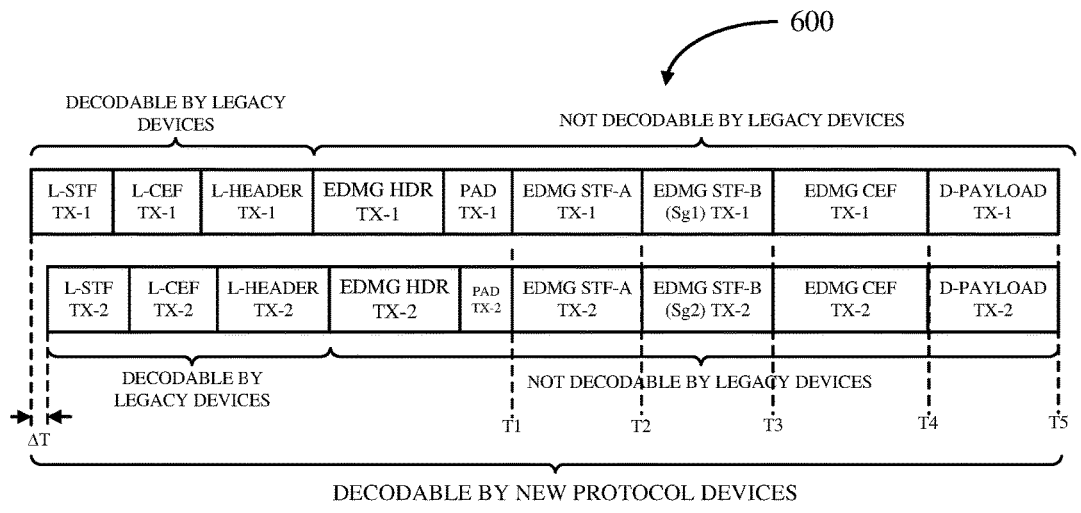
FIG. 6 illustrates an exemplary two transmit chain subframe MIMO frame in accordance with certain aspects of the present disclosure.

FIG. 6 illustrates an exemplary two transmit chain subframe MIMO frame 600 in accordance with another aspect of the present disclosure. The MIMO frame 600 comprises a first transmit chain subframe including legacy portion L-STF TX-1, L-CEF TX-1, and L-Header TX-1. The first transmit chain subframe further includes the new protocol portion EDMG Header TX-1, PAD TX-1, EDMG STF-A TX-1, EDMG STF-B TX-1, EDMG CEF TX-1, and data payload TX-1. Similarly, the MIMO frame 600 further comprises a second transmit chain subframe including a legacy portion L-STF TX-2, L-CEF TX2, and L-Header TX-2. The second transmit chain subframe further includes the new protocol portion EDMG Header TX-2, PAD TX-2, EDMG STF-A TX-2, EDMG STF-B TX-2, EDMG CEF TX-2, and data payload TX-2.

To prevent unintentional beamforming at the transmitter and/or receiver, the transmission of the L-STF TX-2, L-CEF TX-2, L-Header TX-2, EDMG Header TX-2, and PAD TX-2 of the second transmit chain subframe is delayed by a time offset ΔT with respect to the transmission of the L-STF TX-1, L-CEF TX-1, L-Header TX-1, EDMG Header TX-1, and PAD TX-1 of the first transmit chain subframe (i.e., the start and end of the corresponding fields of the two transmit chains are transmitted in a time-offset manner).

The remaining respective portions of the first and second transmit chain subframes are transmitted in a substantially time-aligned manner. For instance, the EDMG STF-A TX-1 and the EDMG STF-A TX-2 are transmitted in a substantially time-aligned manner. The EDMG STF-B TX-1 and the EDMG STF-B TX-2 are transmitted in a substantially time-aligned manner. The EDMG CEF TX-1 and the EDMG CEF TX-2 are transmitted in a substantially time-aligned manner And, the data payload TX-1 and the data payload TX-2 are transmitted in a time-aligned manner As illustrated, the length of the PAD TX-1 is longer than the length of the PAD TX-2. Accordingly, the PADs TX-1 and TX-2 provide an interface between the time-offset portion of the L-STF, L-CEF, L-Header, and EDMG Header and the time-aligned portion EDMG STF-A, EDMG STF-B, EDMG CEF, and data payload. As previously discussed, the PAD TX-1 may include a guard interval (GI) of a first length, and the PAD TX-2 may include a guard interval (GI) of a second length, wherein the first length is greater than the second length. Also, as previously discussed, the guard interval of the PAD TX-1 may be based on a Golay sequence with a first length, and the guard interval of the PAD TX-2 may be based on a Golay sequence with a second length, the first length being greater than the second length.

The frequency-domain PRBS data of the EDMG STF-A TX-1 may be based on a first particular seed for a particular primitive polynomial, and the frequency-domain PRBS data of the EDMG STF-A TX-2 may be based on a second particular seed for the same particular primitive polynomial (See FIG. 11). The frequency-domain PRBS data of the EDMG STF-A TX-1 has low cross-correlation with the frequency-domain PRBS data of the EDMG STF-A TX-2. Accordingly, the transmitter and receiver are able to separate for frequency-domain PRBS data of both the EDMG STF-A TX-1 and EDMG STF-A TX-2 so that independent AGC may be performed for both the first and second transmit subframes TX-1 and TX-2.

The time-domain sequence of the EDMG STF-B TX-1 may be based on the Sg1(n) ("Sg1" for short) sequence described above, and the EDMG STF-B TX-2 may be based on the Sg2(n) ("Sg2" for short) sequence described above. Both sequences Sg1 and Sg2 are orthogonal to each other. Accordingly, a receiver is able to separate the sequences Sg1 and Sg2 to independently set the input sample windows for performing substantially parallel FFT processing of the received samples from the first and second transmit chain subframes TX-1 and TX-2.

The frequency-domain pilots of the EDMG CEF TX-1 and EDMG CEF TX-2 have been processed by the P-matrix as discussed above to provide symbol diversity among the frequency-domain pilots. Accordingly, a receiver is able to separate the frequency-domain pilots of the EDMG CEF TX-1 and EDMG CEF TX-2 to perform independent channel estimation and equalization for the received first and second transmit chain subframes TX-1 and TX-2.

Figure 7:
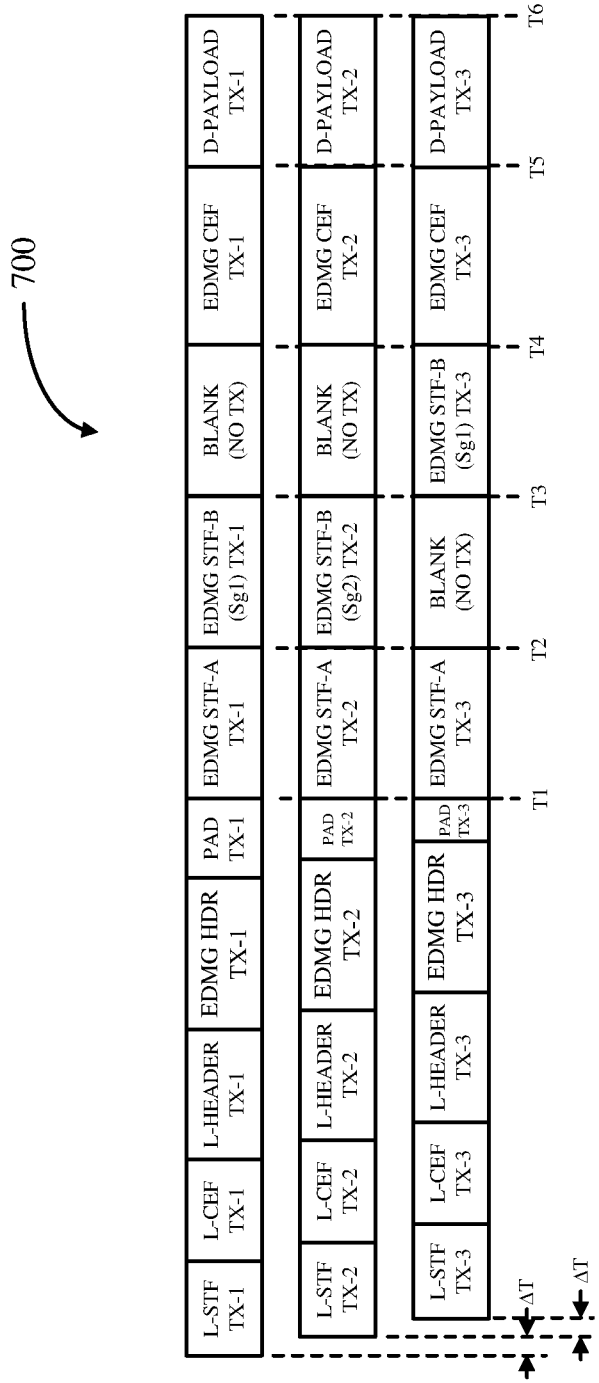
FIG. 7 illustrates an exemplary three transmit chain subframe MIMO frame in accordance with certain aspects of the present disclosure.

FIG. 7 illustrates an exemplary three transmit chain subframe MIMO frame 700 in accordance with another aspect of the present disclosure. The MIMO frame 700 comprises a first transmit chain subframe including legacy portion L-STF TX-1, L-CEF TX-1, and L-Header TX-1. The first transmit chain subframe further includes the new protocol portion EDMG Header TX-1, PAD TX-1, EDMG STF-A TX-1, EDMG STF-B TX-1, EDMG CEF TX-1, and data payload TX-1. Similarly, the MIMO frame 700 further comprises a second transmit chain subframe including a legacy portion L-STF TX-2, L-CEF TX2, and L-Header TX-2. The second transmit chain subframe further includes the new protocol portion EDMG Header TX-2, PAD TX-2, EDMG STF-A TX-2, EDMG STF-B TX-2, EDMG CEF TX-2, and data payload TX-2. Also, the MIMO frame 700 further comprises a third transmit chain subframe including a legacy portion L-STF TX-3, L-CEF TX-3, and L-Header TX-3. The third transmit chain subframe further includes the new protocol portions EDMG Header TX-3, PAD TX-3, EDMG STF-A TX-3, EDMG STF-B TX-3, EDMG CEF TX-3, and data payload TX-3.

To prevent unintentional beamforming at the transmitter and/or receiver, the transmission of the L-STF TX-2, L-CEF TX-2, L-Header TX-2, EDMG Header TX-2, and PAD TX-2 of the second transmit chain subframe is delayed by a time offset ΔT with respect to the transmission of the L-STF TX-1, L-CEF TX-1, L-Header TX-1, EDMG Header TX-1, and PAD TX-1 of the first transmit chain subframe. And, the transmission of the L-STF TX-3, L-CEF TX-3, L-Header TX-3, EDMG Header TX-3, and PAD TX-3 of the third transmit chain subframe is delayed by a time offset ΔT with respect to the transmission of the L-STF TX-2, L-CEF TX-2, L-Header TX-2, EDMG Header TX-2, and PAD TX-2 of the second transmit chain subframe.

The remaining respective portions of the first, second, and third transmit chain subframes are transmitted in a substantially time-aligned manner, with a couple of exceptions as noted below. For instance, the EDMG STF-A TX-1, the EDMG STF-A TX-2, and the EDMG STF-A TX-3 are transmitted in a substantially time-aligned manner. The EDMG STF-B TX-1 and the EDMG STF-B TX-2 are transmitted in a substantially time-aligned manner in a first OFDM symbol interval. The third transmit chain subframe is configured for no transmission (blank) during the first OFDM symbol interval. The EDMG STF-B TX-3 is transmitted during a second OFDM symbol interval. The first and second transmit chain subframes are configured for no transmission (blank) during the second OFDM symbol interval. The EDMG CEF TX-1, EDMG CEF TX-2, and the EDMG CEF TX-3 are transmitted in a substantially time-aligned manner. And, the data payload TX-1, data payload TX-2, and the data payload TX-3 are transmitted in a time-aligned manner.

As illustrated, the length of the PAD TX-1 is greater than the length of the PAD TX-2 which, in turn, is greater than the length of the PAD TX-3. Accordingly, the PADs TX-1, TX-2, TX-3 provide an interface between the time-offset portion L-STF, L-CEF, L-Header, and EDMG Header and the time-aligned portion EDMG STF-A, EDMG STF-B, EDMG CEF, and data payload. The PAD TX-1 may include a guard interval (GI) of a first length, the PAD TX-2 may include a guard interval (GI) of a second length, and the PAD TX-3 may include a guard interval (GI) of a third length, wherein the first length is greater than the second length, and the second length is greater than the third length. Also, as previously discussed, the guard interval of the PAD TX-1 may be based on a Golay sequence with a first length, the guard interval of PAD TX-2 may be based on a Golay sequence with a second length, and the guard interval of PAD TX-3 may be based on a Golay sequence with a third length, wherein the first length is greater than the second length, and the second length is greater than the third length.

The frequency-domain PRBS data of the EDMG STF-A TX-1 may be based on a first particular seed for a particular primitive polynomial, the frequency-domain PRBS data of the EDMG STF-A TX-2 may be based on a second particular seed for the same particular primitive polynomial, and the frequency-domain PRBS data of the EDMG STF-A TX-3 may be based on a third particular seed for the same particular primitive polynomial (See FIG. 11). Accordingly, the transmitter and receiver are able to separate for frequency-domain PRBS data of the EDMG STF-A TX-1, EDMG STF-A TX-2, and EDMG STF-A TX-3 so that independent AGC may be performed for the first, second, and third transmit subframes TX-1, TX-2, and TX-3.

The time-domain sequence of the EDMG STF-B TX-1 may be based on the Sg1 sequence described above, and the EDMG STF-B TX-2 may be based on the Sg2 sequence described above. Both sequences Sg1 and Sg2 are orthogonal to each other. Accordingly, a receiver is able to separate the sequences Sg1 and Sg2 to independently set the received sample windows for performing substantially parallel FFT processing of the received samples from the first and second transmit chain subframes TX-1 and TX-2. The EDMG STF-B TX-3 may be based on either the Sg1 (as illustrated in FIG. 7) or the Sg2 sequence.

The frequency-domain pilots of the EDMG CEF TX-1, EDMG CEF TX-2, and EDMG CEF TX-3 have been processed by the 3×3 P-matrix as discussed above to provide symbol diversity among the frequency-domain pilots. Accordingly, a receiver is able to separate the frequency-domain pilots of the EDMG CEF TX-1, EDMG CEF TX-2, and EDMG CEF TX-3 to perform independent channel estimation and equalization for the received first, second, and third transmit chain subframes TX-1, TX-2, and TX-3.

Figure 8:
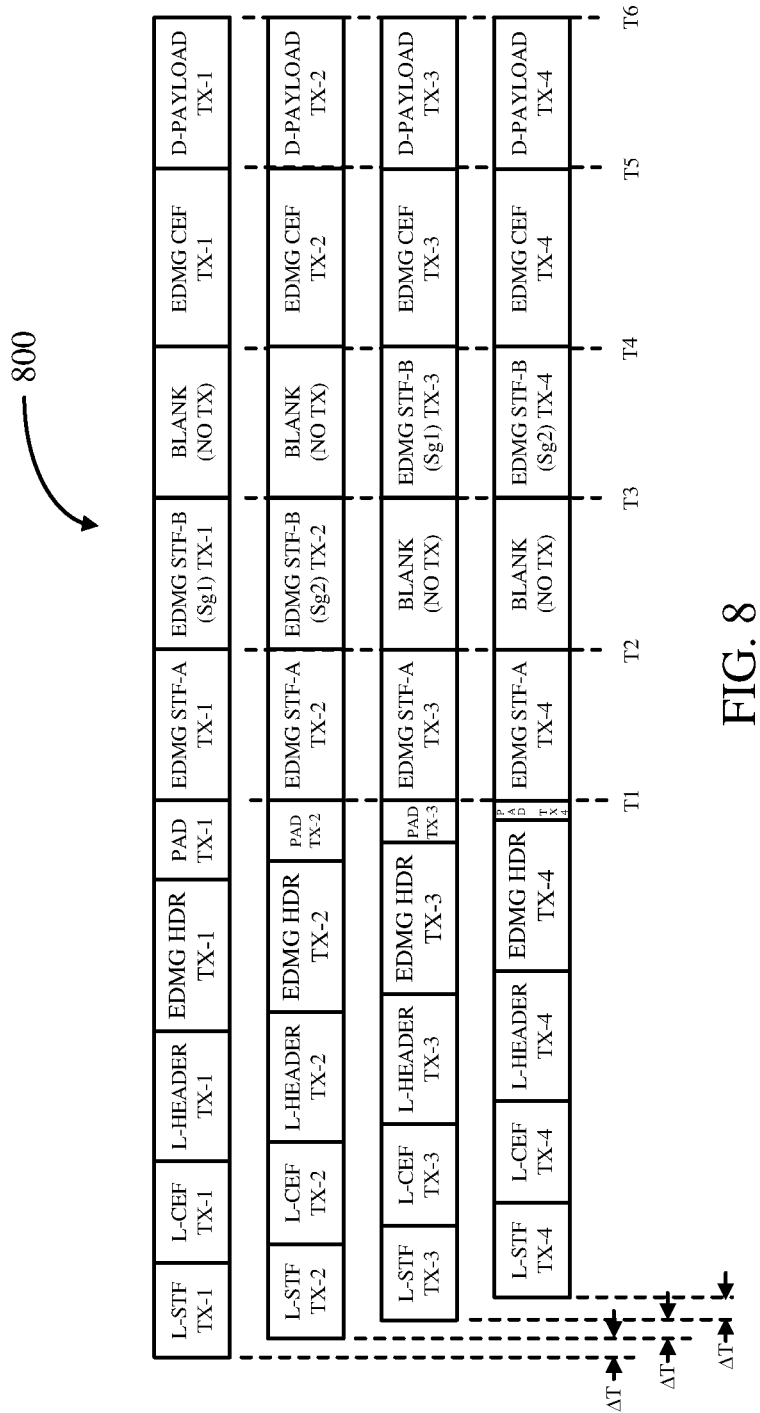
FIG. 8 illustrates an exemplary fourth transmit chain subframe MIMO frame in accordance with certain aspects of the present disclosure.

FIG. 8 illustrates an exemplary four transmit chain MIMO frame 800 in accordance with another aspect of the present disclosure. The MIMO frame 800 comprises a first transmit chain subframe including legacy portion L-STF TX-1, L-CEF TX-1, and L-Header TX-1, and new protocol portion EDMG Header TX-1, PAD TX-1, EDMG STF-A TX-1, EDMG STF-B TX-1, EDMG CEF TX-1, and data payload TX-1. The MIMO frame 700 further comprises a second transmit chain subframe including a legacy portions L-STF TX-2, L-CEF TX-2, and L-Header TX-2 and new protocol portion EDMG Header TX-2, PAD TX-2, EDMG STF-A TX-2, EDMG STF-B TX-2, EDMG CEF TX-2, and data payload TX-2.

Similarly, the MIMO frame 800 comprises a third transmit chain subframe including legacy portion L-STF TX-3, L-CEF TX-3, and L-Header TX-3, and new protocol portions EDMG Header TX-3, PAD TX-3, EDMG STF-A TX-3, EDMG STF-B TX-3, EDMG CEF TX-3, and data payload TX-3. The MIMO frame 800 further comprises a fourth transmit chain subframe including legacy portion L-STF TX-4, L-CEF TX-4, and L-Header TX-4 and new protocol portion EDMG Header TX-4, PAD TX-4, EDMG STF-A TX-4, EDMG STF-B TX-4, EDMG CEF TX-4, and data payload TX-4.

To prevent unintentional beamforming at the transmitter and/or receiver, the transmission of the L-STF TX-2, L-CEF TX-2, L-Header TX-2, EDMG Header TX-2, and PAD TX-2 of the second transmit chain subframe is delayed by a time offset ΔT with respect to the transmission of the L-STF TX-1, L-CEF TX-1, L-Header TX-1, EDMG Header TX-1, and PAD TX-1 of the first transmit chain subframe. And, the transmission of the L-STF TX-3, L-CEF TX-3, L-Header TX-3, EDMG Header TX-3, and PAD TX-3 of the third transmit chain subframe is delayed by a time offset ΔT with respect to the transmission of the L-STF TX-2, L-CEF TX-2, L-Header TX-2, EDMG Header TX-2, and PAD TX-2 of the second transmit chain subframe. The transmission of the L-STF TX-4, L-CEF TX-3, L-Header TX-4, EDMG Header TX-4, and PAD TX-4 of the fourth transmit chain subframe is delayed by a time offset ΔT with respect to the transmission of the L-STF TX-3, L-CEF TX-3, L-Header TX-3, EDMG Header TX-3, and PAD TX-3 of the third transmit chain subframe.

The remaining respective portions of the first, second, and third transmit chain subframes are transmitted in a substantially time-aligned manner, with a couple of exceptions as noted below. For instance, the EDMG STF-A TX-1, the EDMG STF-A TX-2, the EDMG STF-A TX-3, and the EDMG STF-A TX-3 are transmitted in a substantially time-aligned manner. The EDMG STF-B TX-1 and the EDMG STF-B TX-2 are transmitted in a substantially time-aligned manner in a first OFDM symbol interval. The third and fourth transmit chain subframes are configured for no transmission (blank) during the first OFDM symbol interval. The EDMG STF-B TX-3 and the EDMG STF-B TX-4 are transmitted during a second OFDM symbol interval. The first and second transmit chain subframes are configured for no transmission (blank) during the second OFDM symbol interval. The EDMG CEF TX-1, EDMG CEF TX-2, EDMG CEF TX-3, and the EDMG CEF TX-4 are transmitted in a substantially time-aligned manner And, the data payload TX-1, data payload TX-2, data payload TX-3, and data payload TX-4 are transmitted in a substantially time-aligned manner.

As illustrated, the length of the PAD TX-1 is greater than the length of the PAD TX-2 which, in turn, is greater than the length of the PAD TX-3, which, in turn is greater than the length of the PAD TX-4. Accordingly, the PADs TX-1, TX-2, TX-3 and TX-4 provide an interface between the time-offset portion of the L-STF, L-CEF, L-Header, and EDMG Header and the time-aligned portion EDMG STF-A, EDMG STF-B, EDMG CEF, and data payload. The PADs TX-1, TX-2, TX-3, and TX04 may include guard intervals (GIs) of first, second, third and fourth length, respectively; whereby the first length is greater than the second length, the second length is greater than the third length, and the third length is greater than the fourth length. Also, as previously discussed, the guard intervals (GIs) of the PADs TX-1, TX-2, TX-3, and TX-4 may be based on respective Golay sequences of first, second, third, and fourth lengths of decreasing order, respectively.

The frequency-domain PRBS data of the EDMG STF-A TX-1 may be based on a first particular seed for a particular primitive polynomial, the frequency-domain PRBS data of the EDMG STF-A TX-2 may be based on a second particular seed for the same particular primitive polynomial, the frequency-domain PRBS data of the EDMG STF-A TX-3 may be based on a third particular seed for the same particular primitive polynomial, and the frequency-domain PRBS data of the EDMG STF-A TX-4 may be based on a fourth particular seed for the same particular primitive polynomial (See FIG. 11). Accordingly, the transmitter and receiver are able to separate for frequency-domain PRBS data of the EDMG STF-A TX-1, EDMG STF-A TX-2, EDMG STF-A TX-3, and EDMG STF-A TX-4 so that independent AGC may be performed for the first, second, third, and fourth transmit subframes TX-1, TX-2, TX-3, and TX-4.

The time-domain sequence of the EDMG STF-B TX-1 may be based on the Sg1 sequence described above, and the EDMG STF-B TX-2 may be based on the Sg2 sequence described above. Both sequences Sg1 and Sg2 are orthogonal to each other. Accordingly, a receiver is able to separate the sequences Sg1 and Sg2 to independently set the received sample windows for performing substantially parallel FFT processing of the received samples from the first and second transmit chain subframes TX-1 and TX-2. Similarly, the time-domain sequence of the EDMG STF-B TX-3 may be based on the Sg1 sequence described above, and the EDMG STF-B TX-4 may be based on the Sg2 sequence described above. As discussed, both sequences Sg1 and Sg2 are orthogonal to each other. Accordingly, a receiver is able to separate the sequences Sg1 and Sg2 to independently set the received sample windows for performing substantially parallel FFT processing of the received samples from the third and fourth transmit chain subframes TX-3 and TX-4.

The frequency-domain pilots of the EDMG CEF TX-1, EDMG CEF TX-2, EDMG CEF TX-3, and EDMG CEF TX-4 have been processed by the 4×4 P-matrix as discussed above to provide symbol diversity among the frequency-domain pilots. Accordingly, a receiver is able to separate the frequency-domain pilots of the EDMG CEF TX-1, EDMG CEF TX-2, EDMG CEF TX-3, and EDMG CEF TX-4 to perform independent channel estimation and equalization for the received transmit chain subframes TX-1, TX-2, TX-3, and TX-4.

Figure 9:
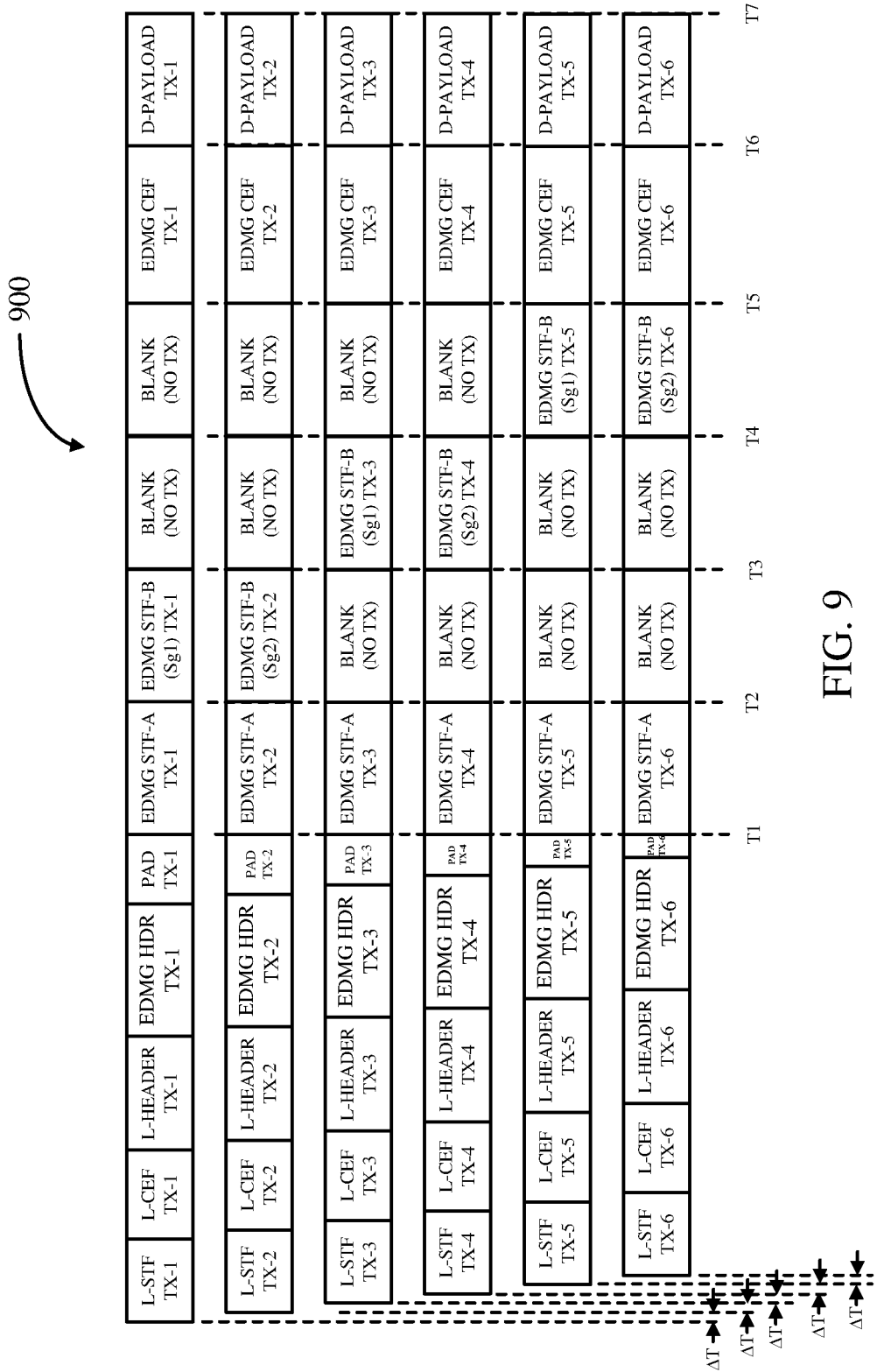
FIG. 9 illustrates an exemplary six transmit chain subframe MIMO frame in accordance with certain aspects of the present disclosure.

FIG. 9 illustrates an exemplary six transmit chain MIMO frame 900 in accordance with certain aspects of the present disclosure. The MIMO frame 900 is similar to that of the four transmit chain MIMO frame 800, but includes an addition two transmit chain subframes TX-5 and TX-6 (similar to adding the two additional transmit chain subframes to the MIMO frame 600 to form MIMO frame 800). Accordingly, the details of configuring the MIMO frame 900 are apparent.

Of noteworthy, because there are six transmit chain subframes, three OFDM symbol intervals are used to transmit the EDMG STF-B of all the transmit chains. During the first OFDM symbol interval, the EDMG STF-B TX-1 with sequence Sg1 and EDMG STF-B TX-2 with sequence Sg2 are transmitted in a substantially time-aligned manner During the first OFDM symbol interval, the transmit chain subframes TX-3 to TX-6 are configured for no transmission (blank). During the second OFDM symbol interval, the EDMG STF-B TX-3 with sequence Sg1 and EDMG STF-B TX-4 with sequence Sg2 are transmitted in a substantially time-aligned manner During the second OFDM symbol interval, the transmit chain subframes TX-1 and TX-2 and TX-5 and TX-6 are configured for no transmission (blank). During the third OFDM symbol interval, the EDMG STF-B TX-5 with sequence Sg1 and EDMG STF-B TX-6 with sequence Sg2 are transmitted in a substantially time-aligned manner During the third OFDM symbol interval, the transmit chain subframes TX-1 to TX-4 are configured for no transmission (blank).

An OFDM frame may be configured to include any even number of transmit chain, such as 8, 10, and 12. In such cases, the numbers of OFDM symbol intervals needed to transmit the corresponding EDMG STF-B are 4, 5, and 6, respectively. Similarly, an OFDM frames may be configured to include any odd number of transmit chains, such as 5, 7, 9 and 11. In such cases, the numbers of OFDM symbol intervals needed to transmit the corresponding EDMG STF-Bs are 3, 4, 5, and 7, respectively.

Figure 10:
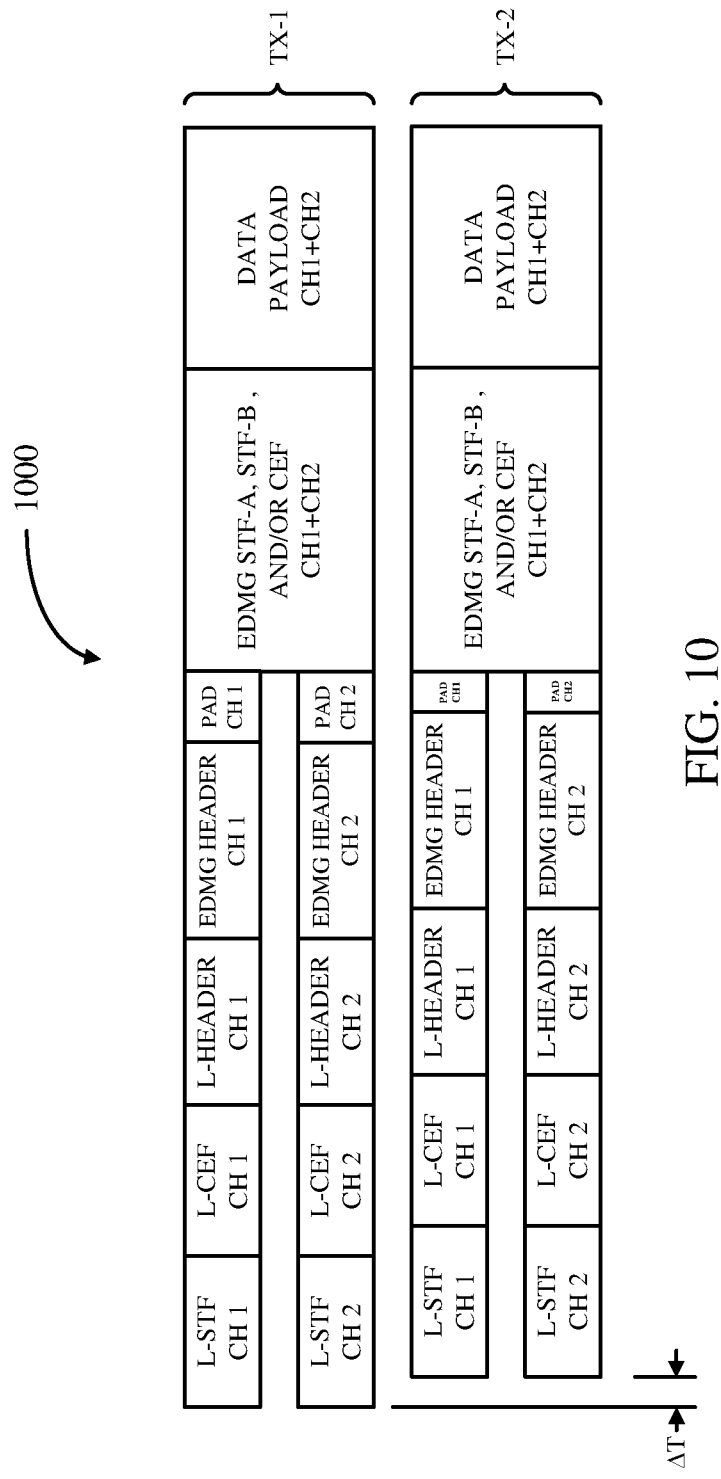
FIG. 10 illustrates an exemplary two transmit chain subframe channel-bonded MIMO frame in accordance with certain aspects of the present disclosure.

FIG. 10 illustrates an exemplary two-transmit chain and two-channel-bonded MIMO frame 1000 in accordance with certain aspects of the present disclosure. The MIMO frame 1000 comprises a first transmit chain subframe TX-1 that may be configured similar to that of frame 500, with the exception that there are two PADs CH1 and CH2 situated in transmission time between the EDMG Header Ch1 and EDMG Header CH2 and the corresponding bonded channel, respectively.

The MIMO frame 1000 further comprises a second transmit chain subframe TX-2 that may also be configured similar to that of frame 500, but with the same exception that there are two PADs CH1 and CH2 situated in transmission time between the EDMG Header CH1 and EDMG Header CH2 and the corresponding bonded channel, respectively. Additionally, the transmission of the L-STF, L-CEF, L-Header, EDMG Header, and PADs of the second transmit chain TX-2 is configured to be delayed by a time offset ΔT with respect to the transmission of the L-STF, L-CEF, L-Header, EDMG Header, and PADs of the first transmit chain subframe TX-1.

The at least one of the EDMG STF-A, EDMG STF-B, EDMG CEF, and data payload of the first transmit chain subframe TX-1 is transmitted in a time aligned manner as the EDMG STF-A, EDMG STF-B, EDMG CEF, and data payload of the second transmit chain subframe TX-2. Accordingly, as previously discussed, the length PADs for the first transmit chain subframe TX-1 is greater than the length of the PADs of the second transmit chain subframe TX-2.

Figure 12:
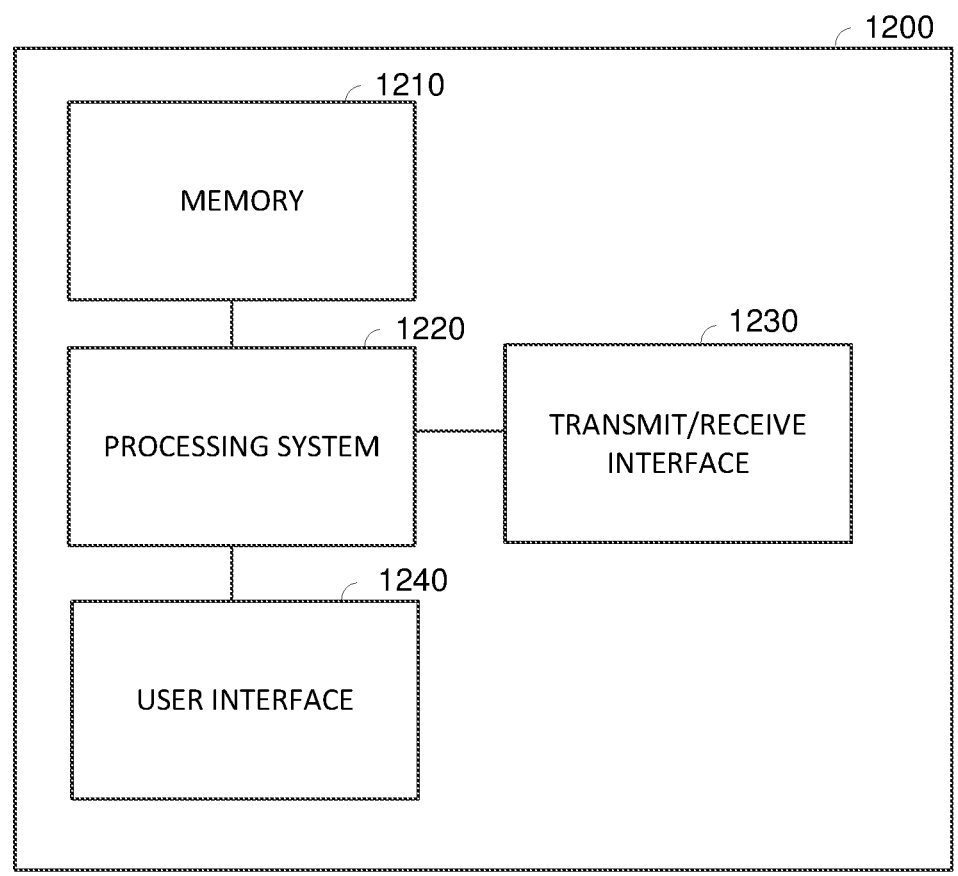
FIG. 12 illustrates a block diagram of an exemplary wireless node in accordance with certain aspects of the present disclosure.

FIG. 12 illustrates an example device 1200 according to certain aspects of the present disclosure. The device 1200 may be configured to operate in an access point or a user device to perform the one or more of the operations described herein. The device 1200 includes a processing system 1220, and a memory 1210 coupled to the processing system 1220. The memory 1210 may store instructions that, when executed by the processing system 1220, cause the processing system 1220 to perform one or more of the operations described herein. Exemplary implementations of the processing system 1220 are provided below. The device 1200 also comprises a transmit/receiver interface 1230 coupled to the processing system 1220. The interface 1230 (e.g., interface bus) may be configured to interface the processing system 1220 to a radio frequency (RF) front end (e.g., transceivers 226-1 to 226-N or 266-1 to 226-M), as discussed further below.

In certain aspects, the processing system 1220 may include one or more of the following: a transmit data processor (e.g., transmit data processor 220 or 260), a frame builder (e.g., frame builder 222 or 262), a transmit processor (e.g., transmit processor 224 or 264) and/or a controller (e.g., controller 234 or 274) for performing one or more of the operations described herein. In these aspects, the processing system 1220 may generate a frame and output the frame to an RF front end (e.g., transceiver 226-1 to 226-N or 266-1 to 266-M) via the interface 1230 for wireless transmission (e.g., to an access point or a user device).

In certain aspects, the processing system 1220 may include one or more of the following: a receive processor (e.g., receive processor 242 or 282), a receive data processor (e.g., receive data processor 244 or 284) and/or a controller (e.g., controller 234 and 274) for performing one or more of the operations described herein. In these aspects, the processing system 1220 may receive a frame from an RF front end (e.g., transceivers 226-1 to 226-N or 266-1 to 266-M) via the interface 1230 and process the frame according to any one or more of the aspects discussed above.

In the case of a user device, the device 1200 may include a user interface 1240 coupled to the processing system 1220. The user interface 1240 may be configured to receive data from a user (e.g., via keypad, mouse, joystick, etc.) and provide the data to the processing system 1220. The user interface 1240 may also be configured to output data from the processing system 1220 to the user (e.g., via a display, speaker, etc.). In this case, the data may undergo additional processing before being output to the user. In the case of an access point 210, the user interface 1240 may be omitted.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For instance, some examples of means for generating or means for configuring a frame include the processing system 1220, frame builder 222, and frame builder 262. Some examples of means for outputting the frame for transmission include the transmit/receive interface 1230, transmit processor 224, and transmit processor 264.

In some cases, rather than actually transmitting a frame, a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It shall be understood that the processing as described herein may be performed by any digital means as discussed above, and or any analog means or circuitry.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of any of the user devices 106 and 110 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
   a processing system configured to generate a frame comprising a first portion and a second portion,
   the first portion being decodable by a first device operating according to a first protocol,
   the second portion not being decodable by the first device,
   wherein the first and second portions are decodable by a second device operating according to a second protocol, and
   wherein the second portion includes:
      a first field, wherein the first field includes a first set of frequency-domain pseudorandom binary sequence (PRBS) data;
      a second field, wherein the second field includes a time-domain sequence; and
      a third field, wherein the third field includes a sequence of frequency-domain pilots; and
   an interface configured to output the frame for transmission.

2. The apparatus of claim 1, wherein the first set of frequency-domain PRBS data is based on a particular seed for a particular primitive polynomial.

3. The apparatus of claim 1, wherein the second portion includes a time-domain sequence.

4. The apparatus of claim 3, wherein the time-domain sequence includes a Golay sequence.

5. The apparatus of claim 1, wherein the second portion includes a sequence of frequency-domain pilots.

6. The apparatus of claim 5, wherein the sequence of frequency-domain pilots has a peak-to-average-power-ratio (PAPR) at or below a particular threshold.

7. The apparatus of claim 1, wherein:
   the first field is configured to facilitate automatic gain control (AGC) at the second device;
   the second field is configured to facilitate timing control for inputting samples of the frame at the second device; and
   the third field is configured to facilitate channel estimation associated with the frame received at the second device.

8. The apparatus of claim 1, wherein the frame includes a first subframe comprising the first and second portions, wherein the frame includes a second subframe comprising a third portion and a fourth portion, the third portion being decodable by the first device operating according to the first protocol, the fourth portion not being decodable by the first device, and the third and fourth portions being decodable by the second device operating according to the second protocol.

9. The apparatus of claim 8, wherein the interface is configured to output the second portion and the fourth portion for transmission in a substantially time-aligned manner.

10. The apparatus of claim 8, wherein the interface is configured to output the first portion and third portion for transmission in a time-offset manner.

11. The apparatus of claim 8, wherein:
   the fourth portion includes a second set of frequency-domain PRBS data;

wherein the interface is configured to output the first and second sets of frequency-domain PRBS data for transmission in a substantially time-aligned manner.

12. The apparatus of claim 11, wherein:
the first set of frequency-domain PRBS data is based on a first seed for a particular primitive polynomial; and
the second set of frequency-domain PRBS data is based on a second seed for the particular primitive polynomial.

13. The apparatus of claim 8, wherein:
the second portion includes a first time-domain sequence; and
the fourth portion includes a second time-domain sequence, wherein the first time-domain sequence is orthogonal to the second time-domain sequence; and
wherein the interface is configured to output the first and second time-domain sequences for transmission in a substantially time-aligned manner.

14. The apparatus of claim 8, wherein:
the second portion includes a first sequence of frequency-domain pilots; and
the fourth portion includes a second sequence of frequency-domain pilots; and
wherein the interface is configured to output the first and second sequences of frequency-domain pilots for transmission in a substantially time-aligned manner.

15. The apparatus of claim 8, wherein the first subframe includes a first pad field situated in time between the first and second portions, wherein the second subframe includes a second pad field situated in time between the third and fourth portions, wherein a length of the first pad field is greater than a length of the second pad field.

16. The apparatus of claim 15, wherein the first pad field includes a first Golay sequence and the second pad field includes a second Golay sequence.

17. The apparatus of claim 1, wherein the frame includes a first subframe comprising the first and second portions, and wherein the frame further includes:
a second subframe comprising a third portion and a fourth portion; and
a third subframe comprising a fifth portion and a sixth portion.

18. The apparatus of claim 17, wherein:
the second portion includes a first time-domain sequence;
the fourth portion includes a second time-domain sequence that is orthogonal to the first time-domain sequence;
the sixth portion includes a third time-domain sequence.

19. The apparatus of claim 18, wherein the interface is configured to output the first and second time-domain sequences for transmission in a time-aligned manner during a first OFDM symbol interval, and wherein the interface is configured to output the third time-domain sequence for transmission during a second OFDM symbol interval.

20. The apparatus of claim 19, wherein:
the interface does not produce an output from the first and second subframes for transmission during the second OFDM symbol interval; and
the interface does not produce an output from the third subframe for transmission during the first OFDM symbol interval.

21. The apparatus of claim 1, wherein the frame includes a first subframe comprising the first and second portions, and wherein the frame further includes:
a second subframe comprising a third portion and a fourth portion;
a third subframe comprising a fifth portion and a sixth portion; and
a fourth subframe comprising a seventh portion and an eighth portion.

22. The apparatus of claim 21, wherein:
the second portion includes a first time-domain sequence;
the fourth portion includes a second time-domain sequence that is orthogonal to the first time-domain sequence, wherein the interface is configured to output the first time-domain sequence and second time-domain sequence for transmission in a time-aligned manner during a first OFDM symbol interval;
the sixth portion includes a third time-domain sequence;
the eighth portion includes a fourth time-domain sequence that is orthogonal to the third time-domain sequence, wherein the interface is configured to output the third time-domain sequence and the fourth time-domain sequence for transmission in a time-aligned manner during a second OFDM symbol interval.

23. The apparatus of claim 22, wherein
the interface does not produce an output from the third and fourth subframes for transmission during the first symbol interval; and
the interface does not produce an output from the first and second subframes for transmission during the second symbol interval.

24. The apparatus of claim 1, wherein the interface is configured to output the first portion for transmission via a first frequency channel, wherein the frame includes a third portion, wherein the interface is configured to output the third portion for transmission via a second frequency channel spaced apart in frequency from the first frequency channel, wherein the third portion is decodable by the first device and the second device, and wherein the interface is configured to output the second portion for transmission via a bonded frequency channel including at least a portion of the first frequency channel and at least a portion of the second frequency channel.

25. The apparatus of claim 24, wherein the second portion includes a time-domain sequence.

26. The apparatus of claim 24, wherein the second portion includes a sequence of frequency-domain pilots.

27. A wireless node, comprising:
at least one antenna;
a processing system configured to generate a frame comprising a first portion and a second portion,
the first portion being decodable by a first device operating according to a first protocol,
the second portion not being decodable by the first device,
wherein the first and second portions are decodable by a second device operating according to a second protocol, and
wherein the second portion includes:
a first field, wherein the first field includes a first set of frequency-domain pseudorandom binary sequence (PRBS) data;
a second field, wherein the second field includes a time-domain sequence; and
a third field, wherein the third field includes a sequence of frequency-domain pilots; and
an interface configured to output the frame for transmission via the at least one antenna.

* * * * *